US010404571B2

(12) United States Patent
Chen

(10) Patent No.: US 10,404,571 B2
(45) Date of Patent: Sep. 3, 2019

(54) COMMUNICATION AMONG NETWORK CONTROLLERS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 582 days.

(21) Appl. No.: 15/073,782

(22) Filed: Mar. 18, 2016

(65) Prior Publication Data
US 2017/0187606 A1 Jun. 29, 2017

Related U.S. Application Data

(60) Provisional application No. 62/272,256, filed on Dec. 29, 2015.

(51) Int. Cl.
*H04L 12/715* (2013.01)
*H04L 12/751* (2013.01)
*H04L 12/753* (2013.01)

(52) U.S. Cl.
CPC .............. *H04L 45/02* (2013.01); *H04L 45/04* (2013.01); *H04L 45/46* (2013.01); *H04L 45/48* (2013.01)

(58) Field of Classification Search
CPC ....... H04L 45/02; H04L 45/48; H04L 1/1812; H04W 28/044
USPC .................................................. 370/252–339
See application file for complete search history.

(56) References Cited

U.S. PATENT DOCUMENTS

2008/0310430 A1\* 12/2008 He .................... H04L 12/462
370/400
2010/0208722 A1 8/2010 Nishioka
2010/0208733 A1 8/2010 Zhao et al.
2013/0163983 A1 6/2013 Skoog
(Continued)

FOREIGN PATENT DOCUMENTS

| CN | 103023780 A | 4/2013 |
|---|---|---|
| CN | 104780056 A | 7/2015 |
| EP | 2640001 A1 | 9/2013 |

OTHER PUBLICATIONS

Moy, J., "OSPF Version 2," Networking Group, RFC 2328, Standards Track, Apr. 1998, 197 pgs.
(Continued)

*Primary Examiner* — Iqbal Zaidi
(74) *Attorney, Agent, or Firm* — Conley Rose, P.C.

(57) ABSTRACT

A network element (NE) is configured to act as a parent controller. The NE receives connection and access point messages from a plurality of child controllers each child controller controlling one or more network domains. The connection and access point messages indicate inter-domain links and access points for the network domains. The NE receives requests to compute a path from a source to a destination traversing one or more of the network domains. The NE computes the path from the source to the destination via the network domains, and transmits a create tunnel segment message to the child controllers controlling network domains along the path. The create tunnel messages instruct the child controllers to create one or more tunnel segments to forward communications from the source to the destination along the path.

19 Claims, 14 Drawing Sheets

(56) References Cited

U.S. PATENT DOCUMENTS

2013/0286893 A1* 10/2013 Zhu .................. H04L 45/64
370/254
2014/0161128 A1   6/2014 Dhody et al.
2015/0103844 A1   4/2015 Zhao et al.
2018/0278520 A1*  9/2018 Fiaschi ............... H04L 45/64

OTHER PUBLICATIONS

Foreign Communication From a Counterpart Application, PCT Application No. PCT/CN2016/076964, English Translation of International Search Report dated Sep. 21, 2016, 7 pages.
Foreign Communication From A Counterpart Application, PCT Application No. PCT/CN2016/076964, English Translation of Written Opinion dated Sep. 21, 2016, 4 pages.
Foreign Communication From A Counterpart Application, European Application No. 16880327.8, Extended European Search Report dated Oct. 24, 2018, 8 pages.

* cited by examiner

COMMUNICATION AMONG NETWORK CONTROLLERS

CROSS-REFERENCE TO RELATED APPLICATIONS

The present application claims priority to U.S. Provisional Patent Application 62/272,256, filed Dec. 29, 2015 by Huaimo Chen and entitled "Communication Among Network Controllers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications networks connect hosts to allow data communication between various geographically distant locations. A control plane is employed to setup and manage data connections while employing traffic engineering (TE) protocols to optimize network efficiency. A data forwarding plane is employed to manage the forwarding of data packets along connections setup by the control plane. Data can be forwarded across wireless networks, optical networks, electrical networks, and electro-optical networks. Maintenance of data connections across various network types require consideration of differing connection constraints.

SUMMARY

In one embodiment, the disclosure includes a network element (NE) configured to act as a parent controller, the NE comprising a receiver configured to receive connection and access point messages from a plurality of child controllers each child controller controlling one or more network domains, wherein the connection and access point messages indicate inter-domain links and access points for the network domains; and receive a request to compute a path from a source to a destination traversing one or more of the network domains; a processor coupled to the receiver and configured to compute the path from the source to the destination via the network domains without receiving the internal topology of the network domains; and a transmitter coupled to the processor and configured to transmit a create tunnel segment message to the child controllers controlling at least one network domain along the path, the create tunnel segment message instructing the associated child controllers to create one or more tunnel segments to forward communications from the source to the destination along the path.

In another embodiment, the disclosure includes a method implemented in a NE the method comprising receiving, via a receiver of the NE, connection and access point messages from a plurality of distributed controllers, each distributed controller controlling one or more network domains, wherein the connection and access point messages indicate inter-domain links and access points for the network domains, via the receiver, a request to compute a path from a source to a destination traversing one or more of the network domains, computing, via a processor of the NE, the path from the source to the destination via the network domains without receiving the internal topology of the network domains; and transmitting, via a transmitter of the NE, create tunnel segment messages to distributed controllers controlling at least one network domain along the path, the create tunnel segment messages instructing the associated distributed controllers to create one or more tunnel segments to forward communications from the source to the destination along the path.

In another embodiment, the disclosure includes a NE configured to act as a distributed controller and a parent controller, the NE comprising a receiver configured to: receive connection and access point messages from a plurality of child controllers each child controller controlling one or more child network domains, wherein the connection and access point messages indicate inter-domain links and access points for the child network domains; receive connection and access point messages from a plurality of distributed controllers, each distributed controller controlling one or more distributed network domains, wherein the connection and access point messages indicate inter-domain links and access points for the distributed network domains; and receive a request to compute a path from a source in one of the child network domains to a destination in one of the distributed network domains; a processor coupled to the receiver and configured to compute the path from the source to the destination via at least one of the child network domains and at least one of the distributed network domains; and a transmitter configured to transmit create tunnel segment messages to the child controllers controlling at least one child network domains along the path, the create tunnel messages instructing the associated child controllers to create one or more tunnel segments to forward communications from the source to the destination along the path; and transmit create tunnel segment messages to distributed controllers controlling at least one distributed network domain along the path, the create tunnel segment messages instructing the associated distributed controllers to create one or more tunnel segments to forward communications from the source to the destination along the path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
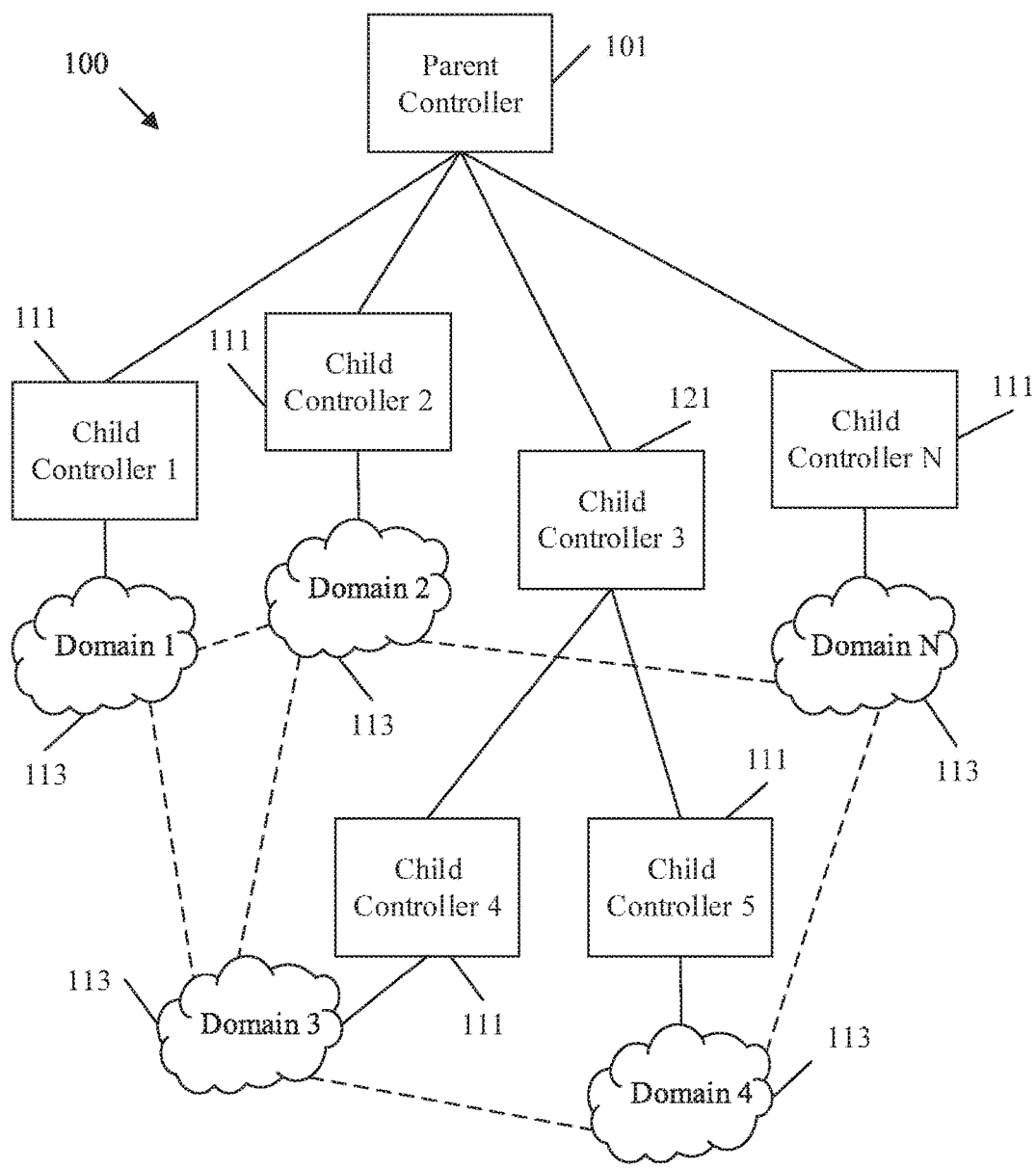
FIG. 1 is a schematic diagram of an embodiment of a hierarchical controller network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a control scheme for managing communications across a multi-domain network while allowing each domain to maintain secrecy for internal topology. The network control plane can be configured in a hierarchical architecture with layers of parent controllers and child controllers, in which the child controllers each maintain direct control over one or more domains. The parent controller makes global path computation and communication tunnel assignment decisions based on domain specific computations performed by the child controllers. The network control plane can also be configured in a distributed architecture with a plurality of distributed controllers with direct control over corresponding domains. Path computations and tunnel assignment decisions can be made on a domain by domain basis. Further, the network control plane can be implemented in a hybrid architecture employing both hierarchical controller groups and distributed controllers. To support the possible combinations of components, the controllers are configured to transmit discover messages to other controllers, the discovery messages indicating the transmitting controllers role(s) such as child, parent, and/or distributed and hierarchy level if applicable. Upon exchanging discovery messages, controllers with direct control over a domain transmit messages indicating inter-domain links and associated domain access points without transmitting internal topology or traffic engineering (TE) information to their adjacent controllers. Each controller is responsible for calculating path segments and TE information in the controller's local domain and transmitting computed path segments and corresponding routing costs in abstracted form to other interested controllers to support global path computation and tunnel assignment while maintaining internal TE confidentiality. Global paths and tunnels are each assigned global identifiers (e.g. global path identifiers (GPIDs), global tunnel identifiers (GTIDs), etc.) to allow the paths/tunnels to be distinguished globally across the multi-domain environment. The disclosure further includes various messages for maintaining global control of the domains, for example messages indicating access point/inter-domain link changes, directing storage and/or removal of computed path segments in a specified domain, and messages directing allocation and/or removal of tunnels in a specified domain.

FIG. 1 is a schematic diagram of an embodiment of a hierarchical controller network 100. The hierarchical network 100 comprises network domains 113, child controllers 111 and 121, and a parent controller 101. The network domains 113 are connected by inter-domain links, depicted as dashed lines, and route data internally and across the inter-domain links. An inter-domain link is any link that couples two domains via one or more access points (e.g. edge nodes). The parent controller 101 and child controllers 111 and 121, are each designated with a level based on a number of hops, in a control plane, of separation from the primary parent controller in the hierarchy (e.g. parent controller 101 is level zero, child controller 121 is level one, and child controllers 111 are level one or level two). Child controllers 111 and 121 each control devices below their level based on instructions from parent controller 101 and/or child controller(s) 121 acting in a parent capacity.

A network domain 113 is a group of interconnected hardware and/or software devices administered by common/shared procedures (e.g. common addressing schemes, security procedures, etc.) Each network domain 113 comprises various network elements (NEs) or nodes configured to forward data. The NEs may include routers, switches, hosts, servers, bridges, etc. The NEs are interconnected by links. The links may include electrical, optical, and/or electro-optical wired connections or wireless connections, depending on the embodiments. Communications routed over a domain must satisfy various constraints, depending on the NEs and links used, to be readable upon exiting the domain. Constraints for an optical domain, such as a dense wavelength division multiplexing (DWDM), may include minimum chromatic dispersion, optical crosstalk, polarization impairments, optical transmitter tuning ranges (e.g. color constraints), directional wavelength assignment constraints, optical signal to noise ratio, quality (Q) factor of optical receivers, optical cross connect requirements in specified nodes, available wavelengths, etc. Constraints for an electrical system may include electrical crosstalk, electrical signal to noise ratio requirements, etc. Network domain 113 may also comprise policy based constraints for specified communication sessions such as required quality of service (QoS), communication priority, bandwidth requirements, routing cost requirements (e.g. minimum number of hops, minimum latency, etc.), etc. The network domains 113 comprise edge nodes configured to act as access points to the domain. Traffic entering or leaving the network domain 113 passes through the access points via inter-domain links. Access points comprise internet protocol (IP), media access control (MAC) and/or virtual addresses that can be accessed from outside of the network domain 113. The access points also provide security (e.g. firewalls) for the network domain 113. The network 100 may comprise an arbitrary number of domains 113, denoted as first (1) through total number (N), as needed for a particular operating environment. Further, some network domains 113 may comprise virtual extensible networks (VxNs) or virtual machines (VMs) that operate as software on hardware and emulate hardware networks.

Each domain 113 is controlled by a child controller 111. A child controller 111 is any controller that operates network equipment based on instructions from a parent controller, such as parent controller 101 or a higher level (where higher level is designated by a smaller level number) child controller 121 acting as both a parent and a child controller. Child controllers 111 are designated by level according to a number of hops from the parent controller 101. As such, child controllers connected directly to the parent controller 101 are level one controllers and child controllers connected to the parent controller 101 via a level one controller are level two controllers, etc. The child controllers 111 may maintain a topology database, a TE database, a forwarding information base (FIB), and/or other data structures to track internal domain 113 topology (e.g. a mapping of the connectivity of nodes and links in the domain), current traffic state, access point state, inter-domain link state, etc. The child controller 111 is configured to compute candidate path segments traversing a corresponding domain 113 that meet any required constraints in response to a request from another controller. The child controller 111 can abstract and return computed path segments to the requesting controller, save the computed segments in memory for later use, and/or remove the segments from memory upon command or after expiration of a specified time period. For example, the child controller 111 can compute path segments traversing a corresponding domain 113 between specified access points and return, to a higher level controller, data indicating the addresses of the access points and the routing costs for traversing the domain 113 without communicating the internal topology or internal constraints of the domain. The child controller 111 can also update that parent controller 101 and/or higher level child controller 121 of topology changes that affect the access points, inter-domain links, and/or computed path segment constraints. The child controllers 111 may also allocate and maintain routing tunnels and/or backup tunnels to transmit communications along a portion of a path traversing the corresponding domain 113.

A parent controller 101 is any controller configured to control routing across a plurality of domains 113 by controlling a plurality of child controllers 111. A parent controller 101 is configured to perform end-to-end path computation and maintenance across domains 113 controlled by the parent controller's lowest level child controllers 111, where a lowest level is indicated by a highest level number. The parent controller 101 is also configured to create and maintain tunnels for routing communications from a source to a destination by traversing domains 113 controlled by the parent controller's lowest level child controllers 111. For example, the parent controller 101 may maintain a data structure indicating each domain 113 under that parent controller's 101, addresses of each domain's 113 access points, and a topology of the inter-domain links. Upon receiving a path computation request, for example from a source node and/or an external application, the parent controller 101 may determine a plurality of candidate paths traversing the domains 113 between the source and the destination. The parent controller 101 may then transmit a path segment message to each child controller 111 and/or 121 controlling a domain 113 along any candidate path. The child controllers 111 and/or 121 may return abstracted path segments connecting specified access points across corresponding domains 113 as well as corresponding constraint values for the path segments. The parent controller 101 may then select a path from the source to the destination traversing multiple domains 113 based on the path segments without knowledge of the internal topology of the domains. The parent controller 101 can then instruct the child controllers 111 and/or 121 to create a tunnel along the path, keep computed segments, remove computed segments, etc.

Child controller 121 is a level one controller, as child controller 121 is one hop away from parent controller 101. As such, child controller 121 acts as a child controller to parent controller 101 and a parent controller to connected layer zero child controllers 111. Accordingly, child controller 121 has the functionality of parent controller 101, but only over the layer zero controllers the child controller 121 controls (e.g. child controllers 4-5). As such, child controller 121 can compute candidate path segments across domains 113 controlled by the child controller's 121 level two child controllers 111 (e.g. domains 3-4) and create corresponding tunnels. It should be noted that while a single layer one child controller 121 is shown, multiple child controllers of varying levels may be employed as needed to implement a particular network topology. As such, child controllers 111 and 121 may be configured as layer one-layer x controllers where x is a value determined by a network administrator. By employing multiple layers, network 100 provides a robust configurable operating environment that can be configured to control all or portions of a network as needed by the network administrator.

Figure 2:
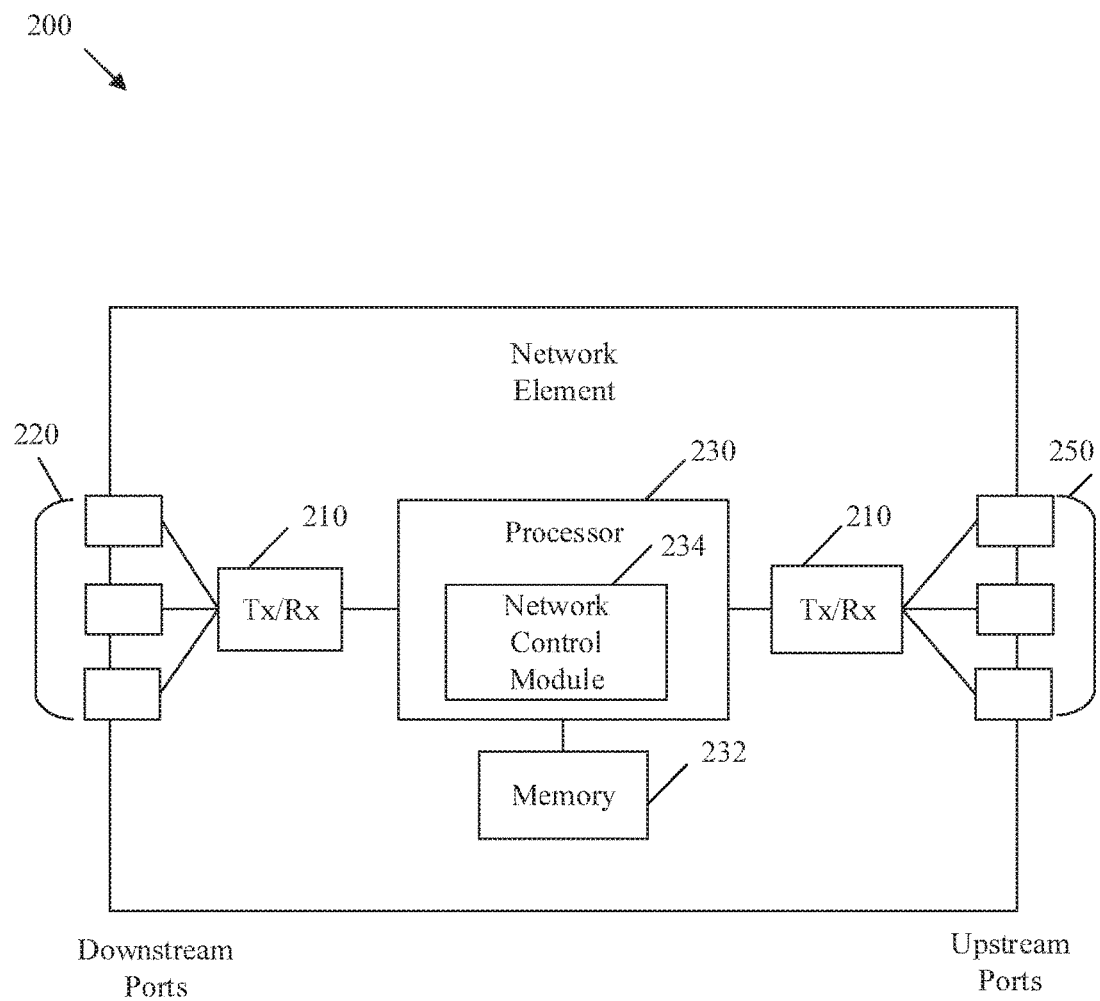
FIG. 2 is a schematic diagram of an embodiment of an NE configured to operate as a controller within a controller network.

FIG. 2 is a schematic diagram of an embodiment of an NE 200 configured to operate as a controller within a controller network, such as network 100, 800, and/or 1400. For example, NE 200 may act as/implement a parent controller 101, child controllers 111, 121, and/or 1422, distributed controller 811 and/or 1411, and/or any other node in networks 100, 800, and/or 1400. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports frames through a network, e.g., a switch, router, bridge, server, a client, etc. As shown in FIG. 2, the NE 200 may comprise transceivers (Tx/Rx) 210, which are transmitters, receivers, or combinations thereof. A Tx/Rx 210 is coupled to a plurality of downstream ports 220 (e.g. downstream interfaces) for transmitting and/or receiving frames from other nodes and a Tx/Rx 210 coupled to a plurality of upstream ports 250 (e.g. upstream interfaces) for transmitting and/or receiving frames from other nodes, respectively. A processor 230 is coupled to the Tx/Rxs 210 to process the frames and/or determine which nodes to send frames to. The processor 230 may comprise one or more multi-core processors and/or memory 232 devices, which function as data stores, buffers. Random Access Memory (RAM), Read Only Memory (ROM), etc. Processor 230 may be implemented as a general processor or may be part of one or more application specific integrated circuits (ASICs) and/or digital signal processors (DSPs). Processor 230 comprises a network control module 234, which implements at least some of the methods discussed herein such as methods 300, 400, 500, 600, 700, 900, 1000, 1100, 1200, 1300, and/or combinations thereof. In an alternative embodiment, the network control module 234 is implemented as instructions stored in memory 232, which are executed by processor 230, or implemented in part in the processor 230 and in part in the memory 232, for example a computer program product stored in a non-transitory memory that comprises instructions that are implemented by the processor 230. In another alternative embodiment, the network control module 234 is implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, network control module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
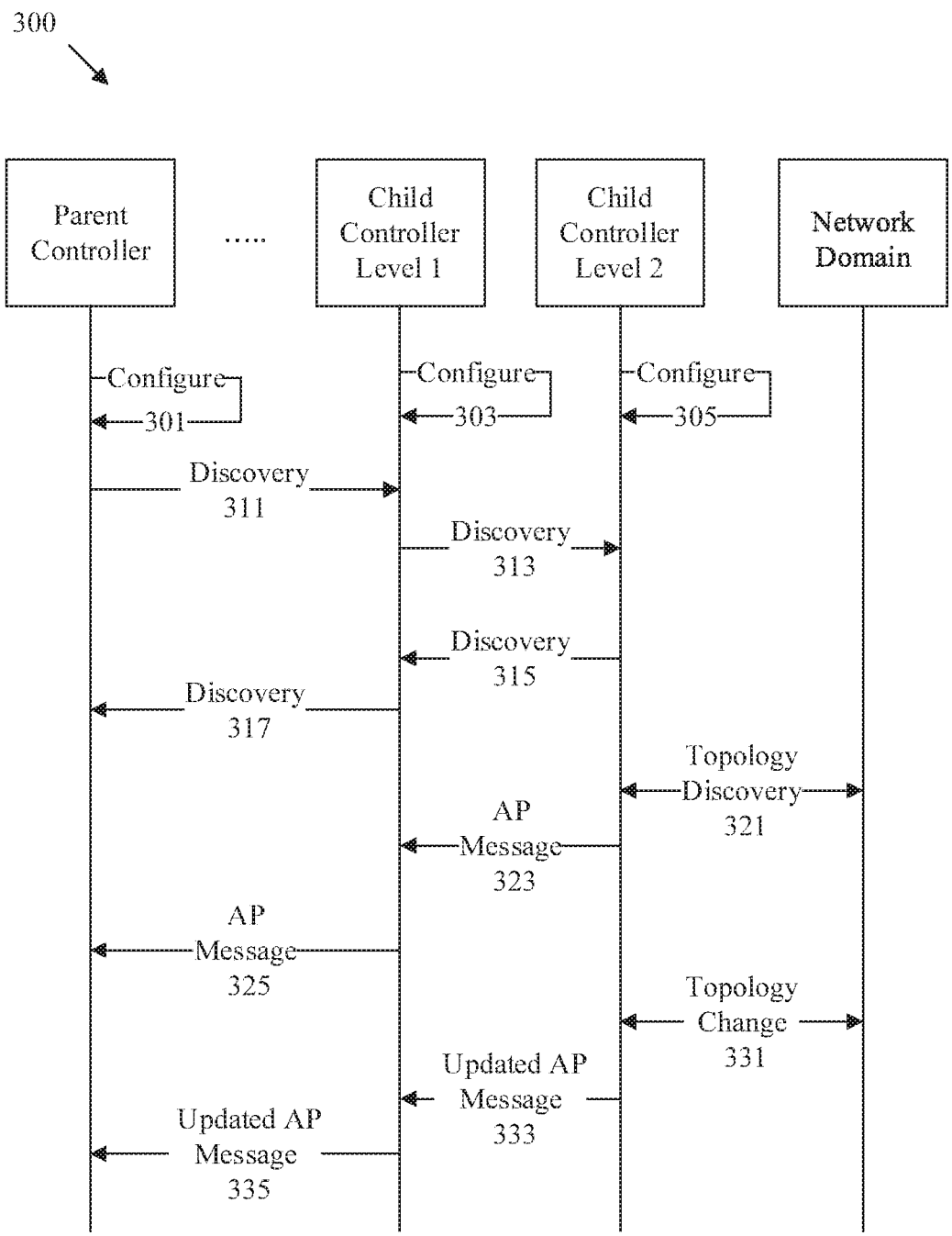
FIG. 3 is a protocol diagram of an embodiment of a method for network discovery in a hierarchical controller network.

FIG. 3 is a protocol diagram of an embodiment of a method 300 for network discovery in a hierarchical controller network, such as network 100. Method 300 is implemented by a parent controller, such as parent controller 101, a level one child controller, such as child controller 121, and a level two child controller, such as a child controller 111, each of which may be implemented by a NE such as NE 200. While a three level hierarchy is shown, one of skill in the art will understand that method 300 can be expanded to any specified number of levels of child controllers by employing the steps of the level one child controller at each new level or reduced to a two level hierarchy by removing the steps of the level one child controller.

Method 300 begins when one or more controllers are initiated. At steps 301, 303, and 305, the parent controller, the level one child controller, and the level two child controller are configured, respectively. Each controller is configured with a role, which specifies the capabilities of the controller. The configuration may be performed automatically or by a user, such as a network administrator. The controllers may be configured with the parent role (e.g. parent controller), the child role (e.g. the level two child controller), or both (e.g. the level one controller). A parent role indicates the controller is capable of performing end-to-end inter-domain path computation (EP), performing end-to-end inter-domain tunnel creation (ET), and performing associated maintenance for the portion of any path/tunnel that traverses domain(s) controlled by the parent controller. For example, parent controller 101 performs path computation and tunnel creation for domains 1-N 113, while child controller 3 121 (in child controller's 3 121 parent role) performs path computation and tunnel creation for domains 3-4 113. A child role indicates the controller is capable of performing intra-domain path segment computation (PS), intra-domain tunnel segment creation (TS), and performing associated maintenance for the path/tunnel segment traversing a domain controlled by the controller. For example, child controller 2 111 computes paths and creates tunnel segments through domain 2 113. Accordingly, a child controller computes path/tunnel segments through the corresponding domain(s) taking into account local topology and constraints and provides an abstracted link (based on the computation), associated inter-domain end points, and computed constraints to the parent controller, and the parent controller performs inter-domain path/tunnel computation based on the abstracted links without considering local topology/TE. Each controller is also configured with a local network address, and data indicating adjacency with adjacent controllers. In an embodiment, the child role indicates the child controller exchanges control messaging with a corresponding parent controller, but not with any child controllers at its same level.

After configuration step 301, at step 311 the parent controller (or a newly initiated child controller in some embodiments) transmits a discovery message to each of the parent controller's adjacent child controllers (e.g. level one child controller). The discovery message of step 311 indicates the parent controller's role as parent, the parent controller's level in the hierarchy (e.g. zero), and the parent controller's network address. The data from the discovery message is stored by the level one child controller. At step 313, the level one child controller as a parent controller transmits another discovery message to each of its adjacent child controllers (e.g. level two child controllers). The discovery message of step 313 indicates the controller's role as parent, the controller's level in the hierarchy (e.g. one), and the parent controller's network address. This process continues down the hierarchy until the lowest child controller in the hierarchy is reached (e.g. level two child controller). At step 315, each level two child controller (e.g. the lowest controller in the hierarchy) sends its parent controller a discovery message indicating the level two child controller's role(s), level, and network address. The level one child controllers sends its parent controller a discovery message at step 317. Once all the discovery messages to a parent controller are received by the parent controller, the parent controller is aware of all its child controller's roles and addresses and vice versa. The discovery messages of steps 311, 313, 315, and 317 may also include explicit signaling of each device's capabilities by employing an EP field, ET field, PS field, and/or a TS field, which can be set to a value of one (or zero) to indicate a corresponding controller is capable of performing the corresponding function.

EP indicates the controller is capable of performing end-to-end inter-domain path computation between any two points in domains controlled by the controller (or lower level controllers under the controller). ET indicates the controller is capable of creating and maintaining end-to-end inter-domain tunnels between any two points in domains controlled by the controller (or lower level controllers under the controller). EP and ET may each be performed based on abstract links traversing domains without knowledge of the underlying topology or TE data of the domains traversed. PS indicates a controller can compute shortest path segments from a specified point in a domain controlled by the controller to each of the edge nodes of the domain and/or to each of the edge nodes of the adjacent domains. The shortest path segment computation is performed by employing an except list and a set of constraints (e.g. physical or policy constraints as discussed above), such that the computed segments all satisfy the constraints and do not terminate at any node in the except list. The PS capable controller may also store the computed path segments for a particular end-to-end path for a specified period of time, hide details about each of the path segments from outside of the domain (e.g. by abstracting the segments into a link), remove the computed path segments upon request, remove the computed path segments after a specified time period, and/or retain a specified group of path segments indefinitely upon request. TS indicates a controller can create and maintain tunnel segments upon request. Specifically, the controller can allocate/reserve resources along a specified path segment in a domain controlled by the controller, and write cross-connects for a tunnel segment along the path segment. The TS capable controller can also remove and/or update the tunnel segments upon request.

The lowest level controllers perform topology discovery at step 321 to determine corresponding network domain topology, network domain physical and/or policy constraints, network domain traffic allocation, etc. Such information is stored in a local data structure, such as a TE database, FIB, routing tables, etc. The level two child controller sends a connections and access point (AP) message at step 323. The AP message of step 323 indicates inter-domain links for the domain controlled by the level two child controller and network addresses of access points (e.g. edge nodes) positioned in the domain and accessible from outside of the domain via the inter-domain links. The data of the AP message is stored by the level one child controller. At step 325, the level one child controller, acting as a parent controller to the level two child controller, sends its parent controller (e.g., the level zero parent controller) an AP message containing the inter-domain links connecting to the adjacent domains not controlled by its child controllers. Thus the parent controller as the level one child controller abstracts the domains controlled by its child controllers as one big domain to its parent controller (e.g., the level zero parent controller). The inter-domain links connecting the domains controlled by its child controllers are hidden from its parent controller. AP messages of steps 323 and 325 may be sent when a lowest level child controller is initiated, may be sent when a lowest level child controller receives a discovery message at step 313, and/or sent periodically. By receiving the AP discovery messages of step 325 from each of its child controllers, the parent controller obtains an abstract high level view of the inter-domain topology without becoming aware of the intra-domain topologies of each network domain. If a child controller fails and/or times out (e.g. fails to periodically send an AP discovery message of step 325), the parent controller may remove the corresponding inter-domain links and access points from the parent controller's database structure and route communications around the domains controlled by the failed controller.

In the event of a topology change at step 331 that affects an access point or an inter-domain link, the level two child controller sends an updated AP message at step 333 to the level one child controller to indicate the change. The level one child controller stores the update and sends an updated AP message to its parent controller for abstracting domains controlled by its child controllers as one big domain to its parent controller, which also stores the update, so that each controller in the hierarchy becomes aware of any access point or inter-domain link changes affecting a domain for which the controller is responsible. Such a process allows continuous notification of data relating to controller capabilities and inter-domain path computation/tunnel creation without providing intra-domain topology or TE information to higher level controllers.

After discovery of connections (e.g. an abstract link) and access points, a parent controller has the exterior information about all the domains controlled by its child controllers. For example, a parent controller is aware of the connections among the domains (e.g. the inter-domain links connecting the domains) controlled by its child controllers and the network addresses of accessible access points in the domains controlled by its child controllers. A connection may comprise attributes for a link connecting domains and the attributes for the end points of the link. The attributes for an end point of a link indicates a type of the end point node such as an area border router (ABR), autonomous system border router (ASBR), and the domain of the end point such as an autonomous system (AS) number and an area number. An access point comprises an address or a prefix of a domain to be accessible outside of the domain.

Figure 4:
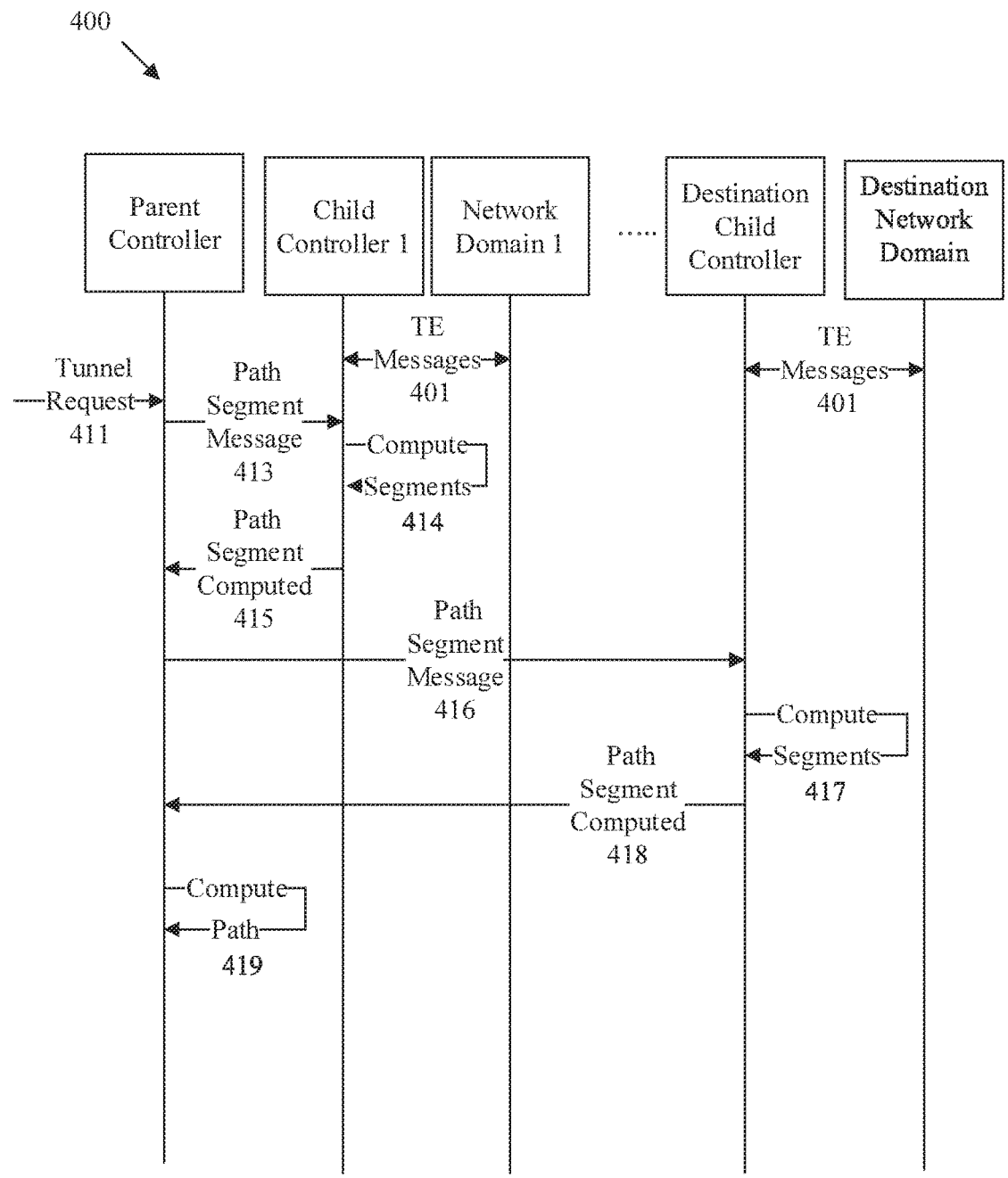
FIG. 4 is a protocol diagram of an embodiment of a method for path computation across network domains controlled by a hierarchical controller network.

FIG. 4 is a protocol diagram of an embodiment of a method 400 for path computation across network domains controlled by a hierarchical controller network, such as network 100. Method 400 is implemented by a parent controller, such as parent controller 101, child controllers 1-N, such as child controllers 111 and/or 121, each of which may be implemented by a NE such as NE 200. The path is computed across one or more domains 1-N, such as domains 113. Method 400 is described as being implemented employing a two level hierarchy for simplicity, but could be adapted to a hierarchy of any level by passing associated messages through network controllers with both the parent and child roles.

Method 400 is initiated after a hierarchical controller network is initiated and configured (e.g. according to method 300), such that the controllers are aware of each other's roles, level, capabilities, etc. At step 401, TE messages are continuously exchanged between each network domain and the network domain's corresponding child controller. The TE messages of step 401 allow each child controller 1-N to maintain awareness of topology, constraints, and/or traffic status for corresponding network domains 1-N. At step 411, a tunnel request is received by the parent controller. The tunnel request of step 411 may be received from an application, and end user (e.g. client) requesting movement of data, a source node requesting movement of data, etc. The tunnel request indicates a source node and a destination node and requests a tunnel be set up to route communications between the source and the destination across a plurality of network domains. The tunnel request may also indicate policy or physical constraints with which the tunnel must comply.

In response to the tunnel request of step 411, the parent controller allocates a GTID to globally identify the inter-domain tunnel and a GPID to globally identify a multi-domain path for the tunnel. The GTID and GPID allow each controller/domain to map any local tunnels/path segments to the corresponding global identifiers regardless of local tunnel/path identification rules to allow consistent tunnel and path identification across multiple domains without sharing internal topology and TE information between domains. The parent controller also determines each domain that could be employed as part of an end-to-end path between the source and destination. The parent controller then sends path segment messages at steps 413 and 416 to each of the related child controller 1-N that controls a network domain potentially along the path in a special order. The path segment messages request computation of candidate path segments spanning the corresponding domains that potentially form part of the end-to-end path. The path segment messages each comprise an address of a node in the domain controlled by the corresponding controller, the node acting as a local source for all path segments to be computed in the domain. The path segment messages further comprise the GTID and GPID for the requested tunnel/path and any policy or physical constraints to be applied to the path segments. The path segment messages further comprise an except list indicating edge nodes that should not be included as part of the path segment computation, for example because domain(s) adjacent to the edge node are not part of the computation, a path segment to the edge node would result in a loop or an unusable high routing cost path due to path segment computations occurring in the adjacent domain, etc. The path segment messages may also comprise options for computing path segments. For example, the path segment messages may comprise an edge (E) flag that is set to one to indicate that shortest path segments should be computed to each of the edge nodes in the domain controlled by the corresponding child controller (except for edge nodes in the except list). The path segment messages may also comprise an outside (O) flag that is set to one to indicate that shortest path segments should be computed to edge nodes in the adjacent domains to the domain controlled by the corresponding child controller (except for the edge nodes in the except list). The parent controller also transmits a path segment message at step 416 to a destination child controller that controls the destination domain containing the destination node. The path segment message of step 416 is substantially similar to path segment message of step 413, but is directed to the destination network domain and comprises an indication of the destination node in the destination network domain.

At steps 414 and 417, each child controller that received a path segment message at steps 413 or 416 computes a set of path segments in the corresponding domain controlled by the child controller. The computed path segments should satisfy the constraints listed in the path segment message of step 413/416 and extend across the corresponding domain from the local source to each edge node of the domain (or adjacent domain) not in the exception list. At step 417, the destination child controller computes path segments in a manner similar to step 413, but computes path segment(s) from the local source to the destination that meet the constraints. The child controllers each transmit a path segments computed message (e.g. a reply message) to the parent at steps 415 and 418. The path segments computed message comprises the GTID and the GPID to allow the path segments to be mapped back to the path segment messages of steps 413 and 416. The path segments computed message also comprise the address/identifier of the local source node (e.g. acting as the access point in the domain), the addresses/identifiers of each edge node/access point acting as a termination point for a computed segment, and a routing cost from the local source node to the corresponding edge node (or edge node in an adjacent domain). The computed path segments may be considered as abstract links because they are described in terms of access points accessible from outside of the domain and corresponding routing cost(s) without disclosing any internal topology. The path segment computed messages of steps 415 and 418 may contain a single lowest routing cost abstracted link or multiple candidate abstract links, depending on the embodiment. At step 419, the parent controller computes/selects the shortest/lowest routing cost end-to-end inter-domain path for GPID by employing the results of the messages of steps 415 and 418 without receiving any internal topology or TE information from the child controllers of the domains. Since each of the path segments meet the constraints, the end-to-end path selected by the parent controller from the set of path segments also meets the constraints. The parent controller can then create a tunnel for GTID traversing the computed path for GPID.

It should be noted that steps 413-418 may be performed sequentially, for example steps 413-415 performed with child controller one, then child controller two, etc. until the destination child controller is reached for steps 416-418. Alternatively, steps 413-418 may be performed in parallel by transmitting the messages of steps 413 and 416 simultaneously, receiving path segments at the parent controller at steps 415 and 418, and building a shortest path tree (SPT) prior to selecting a final path at step 419. In another embodiment, the parent controller sends a path segment message to the source controller first at step 413, builds a SPT after receiving the path segments computed by the source controller at step 415, and then sends a path segment message to its child controller controlling the domain containing the node just added into the SPT. After receiving the path segments computed from its child controller, the parent controller continues to build the SPT using the path segments as links, and then sends a path segment message to its child controller controlling the domain containing the node just added into the SPT. This process continues until the destination node is added into the SPT. It should also be noted that the child controllers may each store the computed path segments along with the GPID and/or the GPID in a local table for a specified period of time. The computed path segments may be automatically removed if no request associated with the computed path segments is received within a specified time period.

Figure 5:
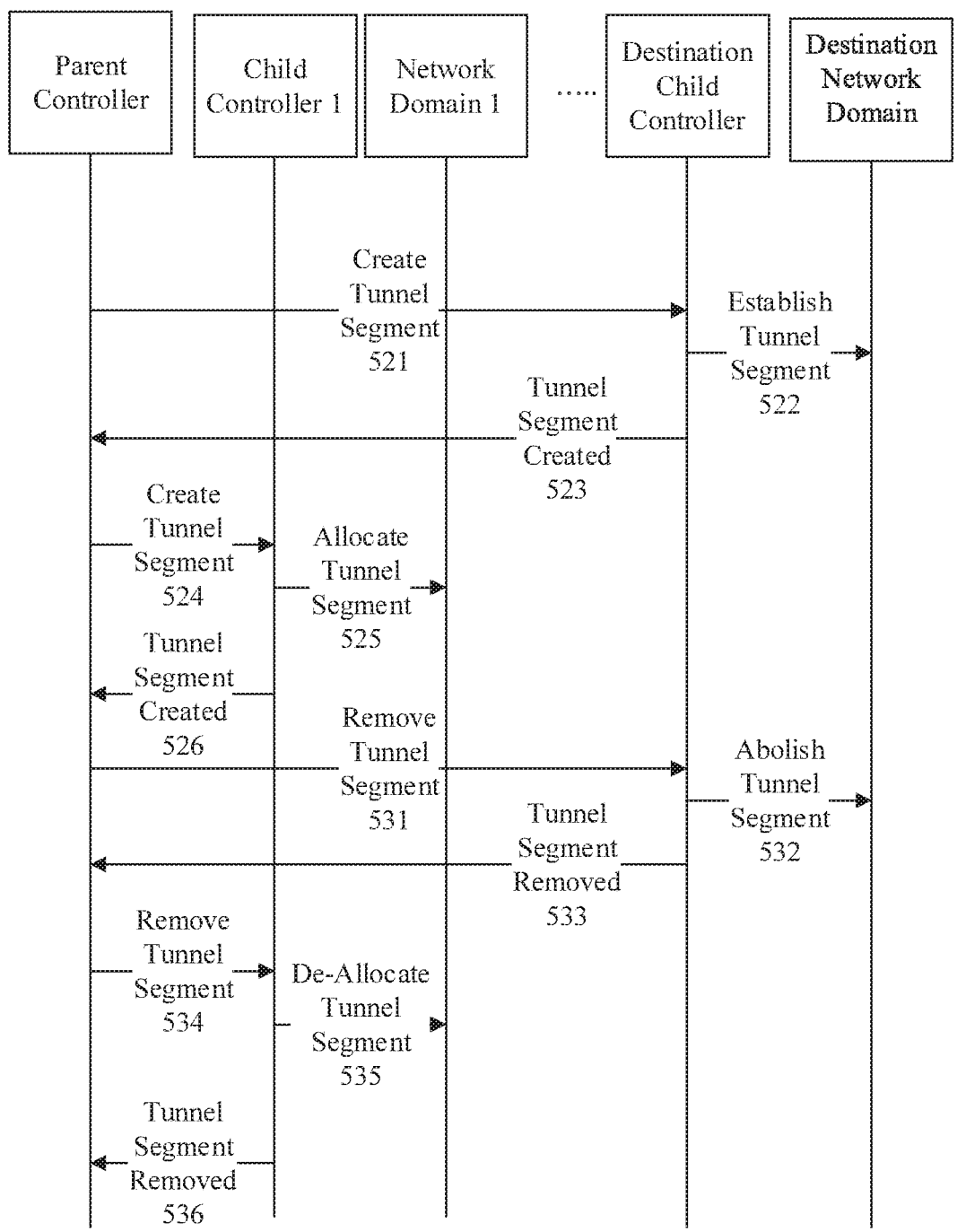
FIG. 5 is a protocol diagram of an embodiment of a method for communication tunnel management across network domains controlled by a hierarchical controller network.

FIG. 5 is a protocol diagram of an embodiment of a method 500 for communication tunnel management across network domains controlled by a hierarchical controller network, such as network 100. Method 500 is implemented by a parent controller, such as parent controller 101, child controllers 1-N, such as child controllers 111 and/or 121, each of which may be implemented by a NE such as NE 200. The end-to-end tunnel to be set up is computed across one or more domains 1-N, such as domains 113. Method 500 is described as being implemented employing a two level hierarchy for simplicity, but could be adapted to a hierarchy of any level by passing associated messages through network controllers with both the parent and child roles.

Method 500 is initiated after an end-to-end path is computed for a GTID and GPID, for example according to method 400. At step 521 a create tunnel segment message is transmitted to the destination child controller along the computed path. The create tunnel segment message of step 521 requests that the destination child controller create a tunnel segment of GTID that spans from a local source in the destination domain to the destination along the computed path for GPID. The create tunnel segment message of step 521 comprises the GIPD and/or the GTID and a pair of identifiers/addresses of a pair of nodes, for example in the form <start point, end point>. For the destination child controller, the start point is the edge node/access point of the destination domain along the GPID path and the end point is the destination. At step 522, the destination child controller establishes the tunnel segment across the destination network domain. The establishment of step 522 includes an allocation of a link(s), port(s), optical wavelengths (λ), and/or reservation of corresponding bandwidth across associated nodes/links between the start point and the end point. When a packet is received by a source node, the packet is encapsulated with a label which is then used by nodes along the tunnel to switch the packet without reviewing the underlying data. The label may remain constant or may be swapped out, for example via pop and push/decapsulation and reencapsualtion operations, when a packet moves between domains. In either case, at step 522 the destination controller allocates a label for use when switching along the tunnel segment in the destination domain. The destination child controller also writes cross-connects on each node along the tunnel segment, for example by updating each node's routing tables, forwarding tables. FIB tables, optical cross-connect configuration, etc.

After establishment is complete, at step 523 the destination child controller transmits a tunnel segment created message to the parent controller. The tunnel segment created message of step 523 comprises the GPID and/or the GTID, a status indicator indicating either that the request tunnel segment was successfully established or indicating a failure to establish the tunnel segment. If status indicator is set to success, tunnel segment created message also comprises the label allocated by the destination child controller and an indication of the interface (e.g. at the access point/edge node) to be used when routing packets along the tunnel into the destination domain. The next hop upstream across the inter-domain link from the destination domain access point/edge node can use the label and the interface to connect the tunnel across the domain boundary. If the tunnel segment creation was not successful (e.g. status indicator set to fail), the tunnel segment created message also comprises an error code and/or reasons for failure.

Steps 524-526 are repeated for each child controller along the path for the GTID and GPID from the destination domain to the source domain. At step 524, a create tunnel segment message is sent to the corresponding child controller. The create tunnel segment message of step 524 is substantially similar to the message of step 521, but also contains the label and interface allocated for the tunnel by the controller of the next hop downstream domain. For example, the message of step 523 contains the label and the interface for the destination domain, which are then sent to the parent controller for an upstream intermediate domain in order to connect the tunnel across the two domains via the inter-domain link. The child controller establishes the tunnel segment at step 525 in a manner similar to step 522. The child controller also writes the cross connect on the downstream edge node with the label and interface information to establish the inter-domain connection. At step 526, a tunnel created message is transmitted to the parent controller in a manner similar to step 523. The label may remain constant over the end-to-end tunnel or may be changed when moving between domains. Upon receiving the tunnel created message from the source domain, the parent controller becomes aware that set up of the end-to-end tunnel is complete and can initiate communication between the source and the destination over the end-to-end tunnel corresponding to GPID and GTID.

The parent controller may determine to tear down the tunnel once communication between the source and destination is complete. For example, the parent controller may receive a tunnel deletion request from an application, from the source node, or from a network administrator/user. The parent controller may also determine to tear down a partial tunnel if abolishment of a tunnel segment fails. At step 531, the parent controller transmits a remove tunnel segment message to the destination child controller. The remove tunnel segment message comprises the GTID and/or the GPID as well as an explicit or implicit indication that the tunnel should be removed. At step 532, the destination child controller releases all reserved bandwidth, label, and/or hardware allocations associated with the GPID/GTID. The destination child controller also removes all cross-connects written to internal domain nodes along the corresponding tunnel segment. At step 533, the destination child controller 533 transmits a tunnel segment removed message to the parent controller. The tunnel segment removed message comprises the GTID and/or GPID and a status of the removal indicating success if the tunnel segments were removed successfully or fail if the tunnel segments cannot be removed. In the event of a failure, the tunnel segment removed message also comprises an error code indicating the reason for the failure. Steps 534, 535, and 536 are substantially similar to steps 531, 532, and 533, respectively, and are repeated from destination to source until the tunnel segments for the end-to-end tunnel are removed. It should be noted that a remove tunnel segment message may also be transmitted when a tunnel segment created message along the path indicates a failure to create a tunnel segment.

Figure 6:
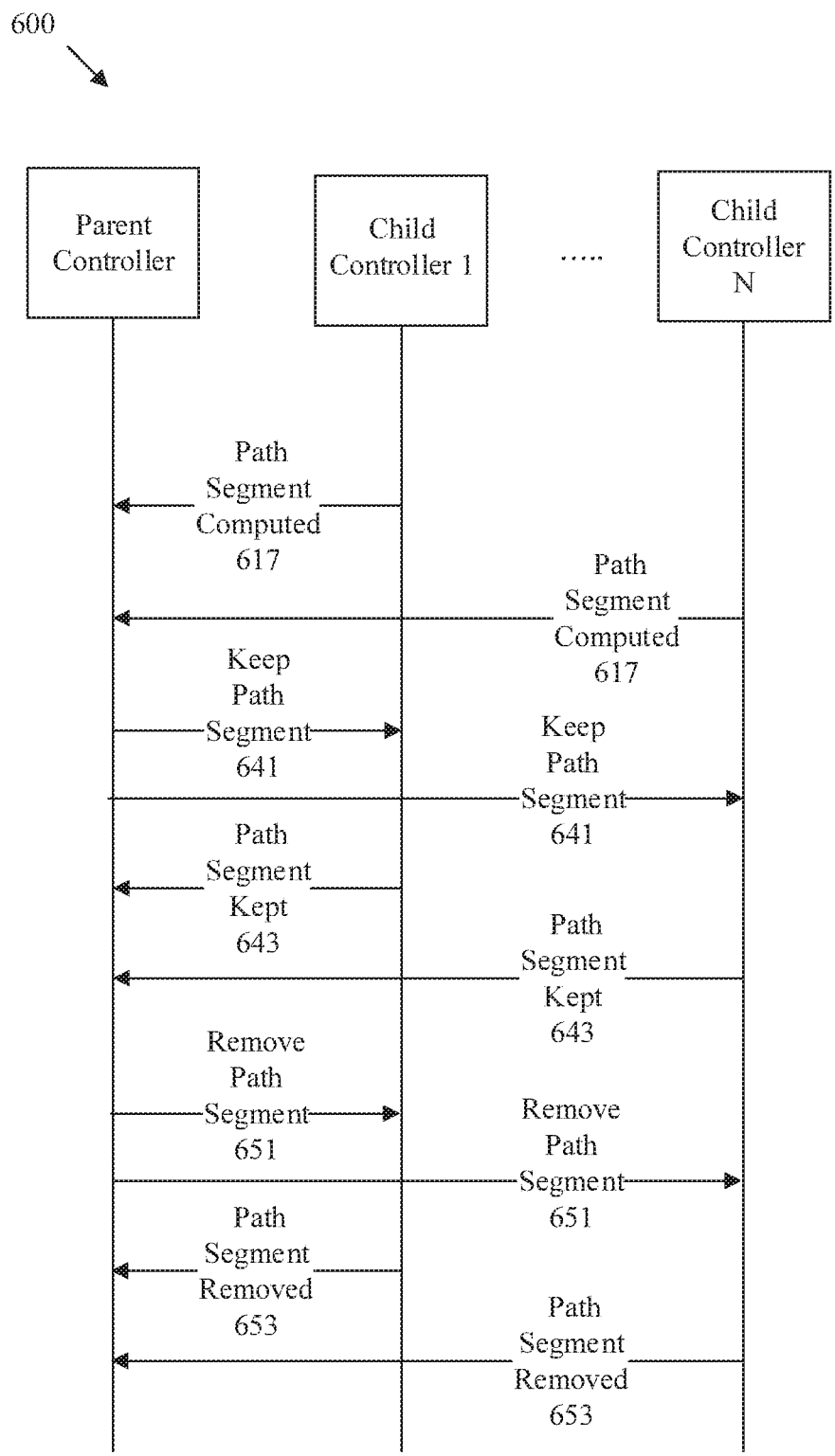
FIG. 6 is a protocol diagram of an embodiment of a method for path segment management across network domains controlled by a hierarchical controller network.

FIG. 6 is a protocol diagram of an embodiment of a method 600 for path segment management across network domains controlled by a hierarchical controller network, such as network 100. Method 600 is implemented by a parent controller, such as parent controller 101, child controllers 1-N, such as child controllers 111 and/or 121, each of which may be implemented by a NE such as NE 200. The path segments to be managed are spread across one or more domains 1-N, such as domains 113. Method 600 is described as being implemented employing a two level hierarchy for simplicity, but could be adapted to a hierarchy of any level by passing associated messages through network controllers with both the parent and child roles.

Method 600 is initiated after path segments have been computed, for example in response to path segment messages at step 413 and/or 416 of method 400. At step 617, the child controllers transmit path segment computed messages indicating computed path segments as abstracted links in a manner substantially similar to steps 415 and/or 418. At step 641, the parent controller transmits keep path segment messages to one or more of the child controllers. The keep path segment messages request that the child controllers store (e.g. indefinitely) a specified group of the computed segments returned in the corresponding path segment computed messages of step 617. A keep path segment message comprises a GTID and/or a GPID corresponding to the computed segments and a list of node pairs identifying each segment to be stored. For example the list of pairs may be in the form of <start point, end point> where start point and end point are addresses of access points for computed segments accessible outside of the domain. The keep path segment messages may also comprise optional flags, such as a remove rest (RR) flag which is set to one to indicate that all computed segments associated with the keep path segment messages and not identified for storage by a node pair should be removed from storage. Upon receiving the keep path segment messages of step 641, the child controllers save the indicated computed path segments and remove all other computed path segments for the tunnel/path if the RR flag is set. The saved/stored path segments are no longer subject to timeout. At step 643, the child controllers transmit responsive path segment kept messages to the parent controller. The path segment kept messages each comprise the GTID and/or GPID and data indicating the status of the corresponding retention requests of step 641. The status data can indicate success to denote that the requested path segments are successfully stored or fail to denote that the path segments cannot be stored. In the event of a fail, a path segment kept message may also include an error code and/or a reason the path segments cannot be stored.

At step 651, the parent controller transmits remove path segment messages to one or more of the child controllers. A remove path segment message indicates to the corresponding child controller that one or more segments stored at step 641 should be removed. A remove path segment message may also be sent to remove unused computed path segments before a timeout occurs or in systems without a default timeout. A remove path segment message may indicate computed path segments to be removed in a plurality of ways. For example, a remove path segment message may contain only a GTID, which indicates the child controller should remove all stored segments related to the GTID. The remove path segment message may contain both a GTID and a GPID, which indicates the child controller should remove all stored path segments related to both the GTID and the GPID. The remove path segment message may contain the GTID and/or the GPID and a list of start point addresses and/or identifiers to indicate that all stored path segments associated with the GTID/GPID and containing the start point address(es)/identifier(s) should be removed. The remove path segment message may contain the GTID and/or the GPID and a list of node pairs, for example in the form <start point, end point>, which indicates that the specifically enumerated path segments as identified by GPID/GTID and node pair should be removed. Upon receiving the remove path segment messages of step 651, the child controllers remove the indicated computed path segments from memory. At step the 653, the child controllers transmit path segment removed messages to the parent controller to indicate the status of the corresponding path segment removal requests. The path segment removed messages of step 653 comprise the GTID and/or GPID and data indicating the status as success to indicate the requested path segments are successfully removed or fail to indicate the requested path segments are not successfully removed. In the event of a fail, the path segment removed messages of step 653 may also comprise an error code and/or a reason for the failure.

Figure 7:
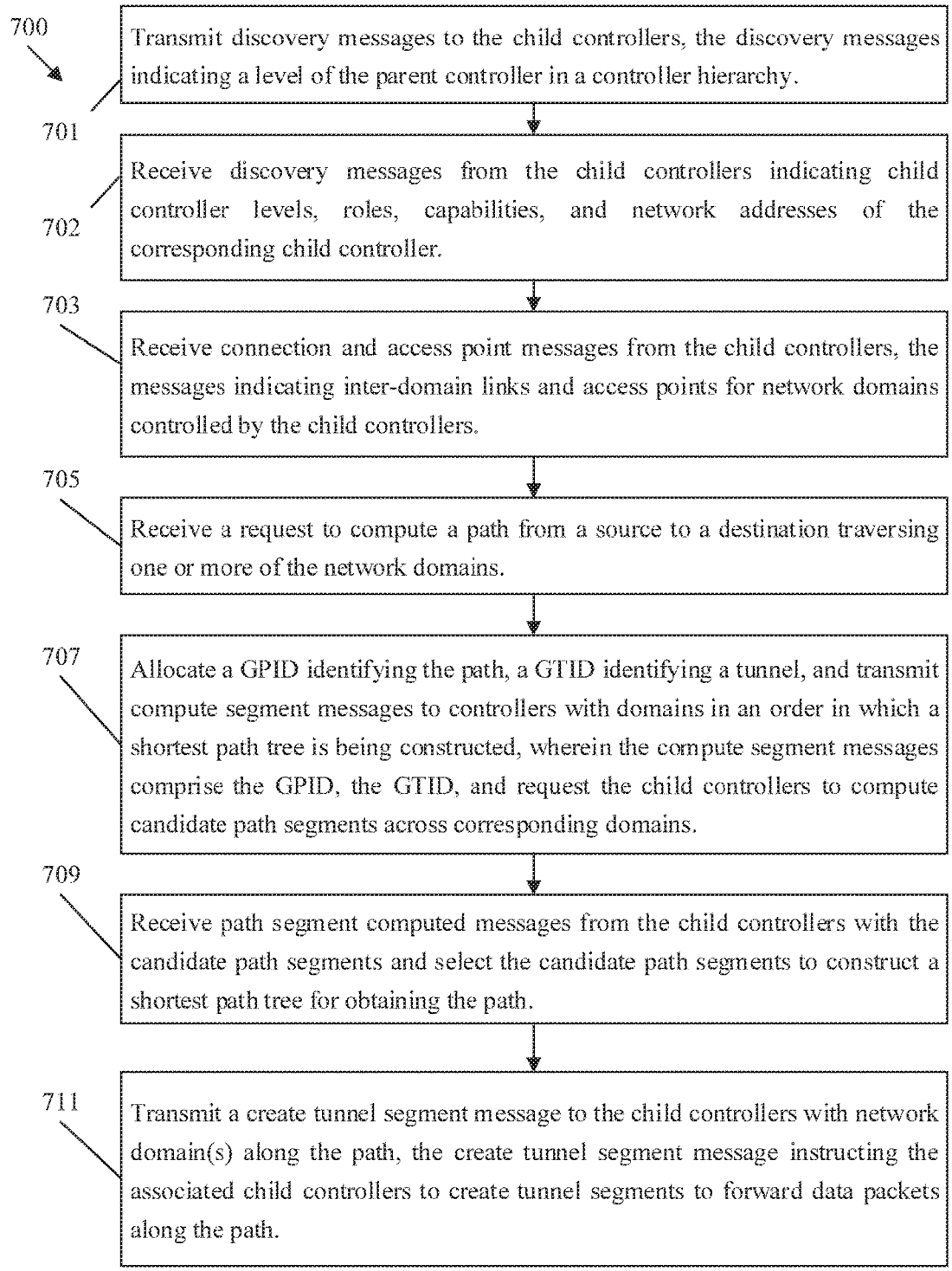
FIG. 7 is a flowchart of an embodiment of a method of operating a parent controller.

FIG. 7 is a flowchart of an embodiment of a method 700 of operating a parent controller, such as parent controller 101 or child controller 121 when acting as a parent in network 100. Method 700 begins when the parent controller determines to discover corresponding child controllers (e.g. child controllers 111 and/or 121). At step 701, discovery messages are transmitted to the child controllers, the discovery messages indicating a level of the parent controller in a controller hierarchy. At step 702, discovery messages are received from the child controllers indicating child controller levels, roles, capabilities, and network addresses of the corresponding child controllers. At step 703, connection and access point messages are received from the child controllers, the messages indicating inter-domain links and access points for network domains controlled by the child controllers. Upon completion of step 703, the parent controller has sufficient information to determine end-to-end inter-domain paths between a source and destination traversing the network domains through communicating with the child controllers.

At step 705, a request is received to compute a path from a source to a destination traversing the network domains. The request may be received from the source, the destination, a child controller controlling a source/destination domain and/or from the application layer (e.g. a user/network administrator). At step 707, a GPID identifying the path and a GTID identifying a tunnel along the path are allocated. Compute segment messages are then transmitted to child controllers with domains in an order in which a shortest path tree is being constructed. The compute segment messages comprise the GPID, the GTID, and request the child controllers to compute candidate path segments across corresponding domains. At step 709, path segment computed messages are received from the child controllers with the requested candidate path segments. The candidate path segments are then selected to construct the shortest path tree for obtaining the path. At step 711, a create tunnel segment message is transmitted to the child controllers with network domain(s) along the path. The create tunnel segment message instructs the associated child controllers to create tunnel segments to forward data packets along the path. The parent controller may also receive tunnel segment created messages indicating the tunnel segments have been properly setup. Further, the parent controller may transmit remove path segment messages or keep path segment messages to cause the computed path segments to be removed or stored, respectively. The parent controller may also receive updated connection and access point messages indicating changes in inter-domain links between domains and access points in domains. The method 700 may return to step 705 if the path/tunnel is interrupted or may consider the updated information when computing new paths/tunnels.

Figure 8:
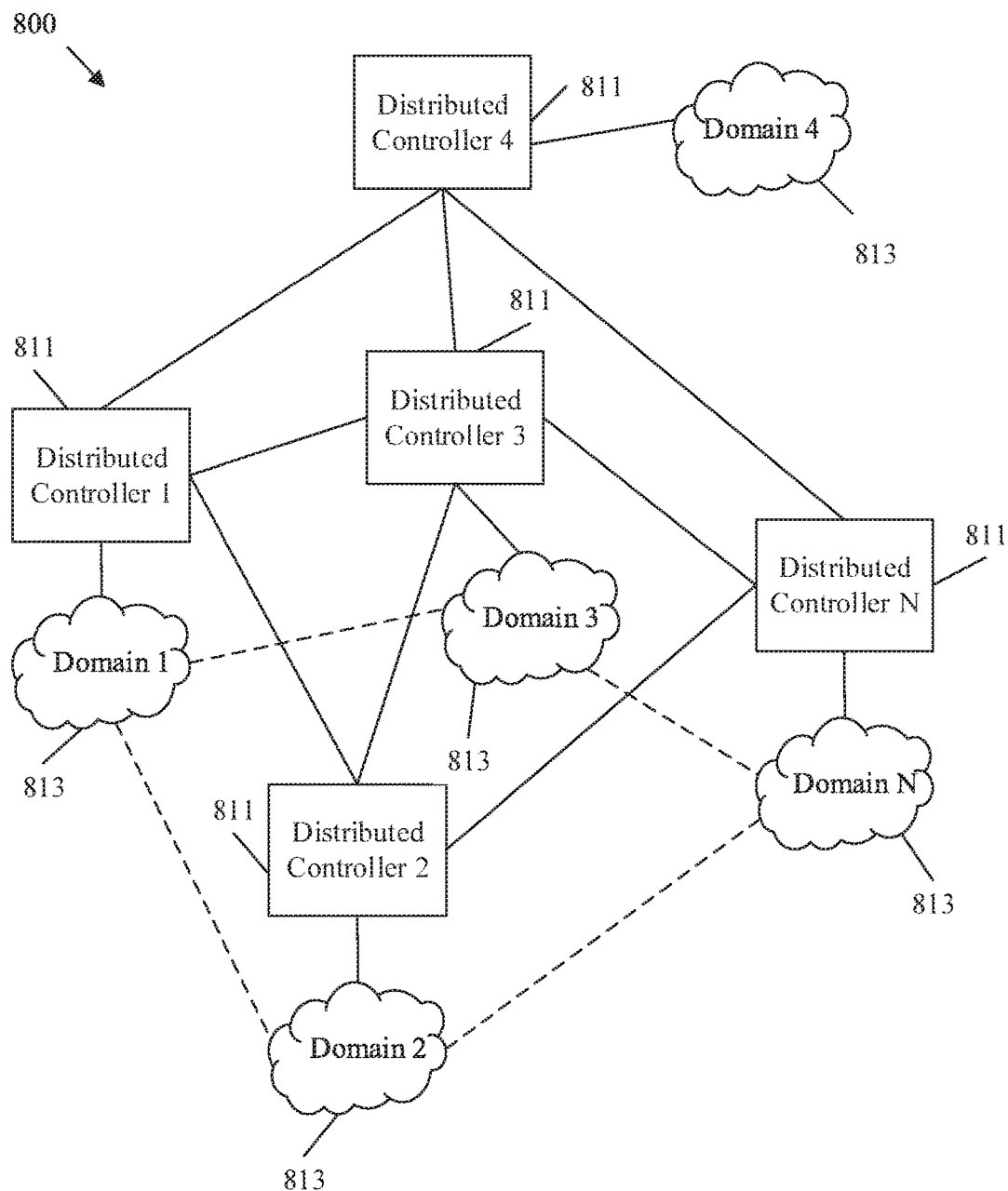
FIG. 8 is a schematic diagram of an embodiment of a distributed controller network.

FIG. 8 is a schematic diagram of an embodiment of a distributed controller network 800. Network 800 comprises a plurality of network domains 813 connected by inter-domain links, which may be substantially similar to network domains 113. The network domains 813 are controlled by distributed controllers 811, which are similar to both child controllers 111 and parent controller 101 and are implemented by NEs such as NE 200. Specifically, distributed controllers 811 control traffic management in one or more network domains 813 in a manner similar to child controllers 111, but have no corresponding parent controller. Accordingly, distributed controllers 811 communicate amongst themselves to compute end-to-end paths and create tunnels in a manner similar to parent controller 101.

A distributed controller 811 is capable of path segment computation and maintenance and tunnel segment creation and maintenance in the domain(s) 813 controlled by the distributed controller 811 (e.g. similar to child controllers 111). The distributed controller 811 is also capable of end-to-end inter-domain path computation and maintenance and end-to-end inter-domain tunnel creation and maintenance across domains not controlled by the distributed controller 811 (e.g. similar to parent controller 101), without receiving internal topology or TE information associated with the domains not controlled by the distributed controller 811. Accordingly, the distributed controller 811 is capable of PS, TS, EP and ET. Unlike a child controller, a distributed controller 811 is configured to exchange control messages directly with adjacent distributed controllers (e.g. instead of relying on a parent controller) as discussed in methods 900-1300. Further functionality of the distributed controllers 811 is discussed with respect to methods 900-1300.

Figure 9:
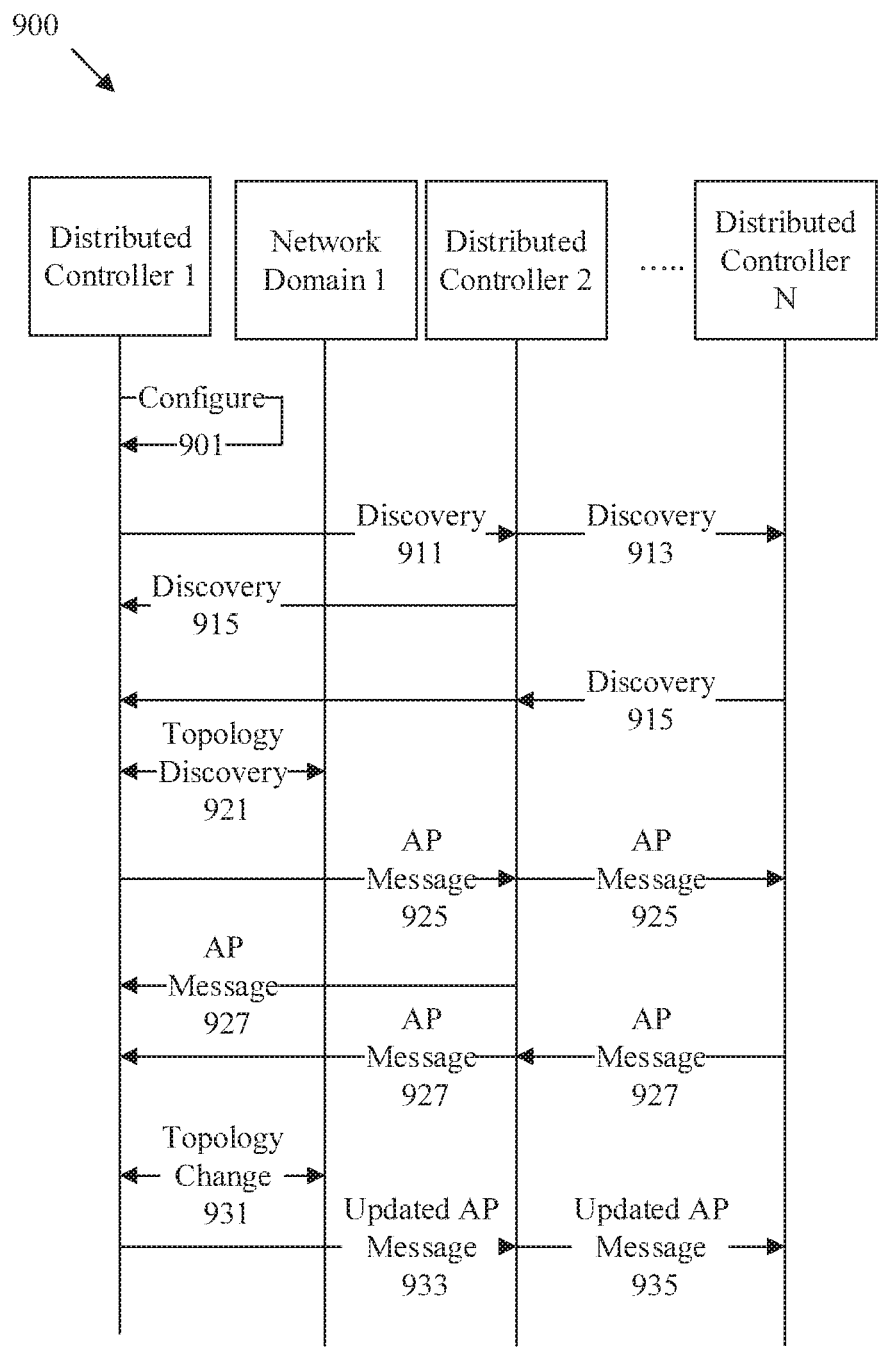
FIG. 9 is a protocol diagram of an embodiment of a method for network discovery in a distributed controller network.

FIG. 9 is a protocol diagram of an embodiment of a method 900 for network discovery in a distributed controller network, such as network 800. Method 900 is implemented by distributed controllers 1-N, such distributed controllers 811, each of which may be implemented by a NE such as NE 200 and each of which controls one or more network domains 1-N, such as network domains 813.

Method 900 may be similar to method 300, but is modified to operate on network 800. Method 900 begins when one or more distributed controllers are initiated. At step 901, the distributed controllers are configured in manner similar to step 301, but are configured with a role of distributed indicating capabilities of PS. TS, EP and ET, a local address, and network adjacencies with other distributed controllers. At step 911, distributed controller 1 transmits a discovery message 911 to adjacent distributed controller 2. The discovery message 911 indicates distributed controller 1's role as a distributed controller, distributed controller 1's local address, and contains flags set to one to indicate the distributed controllers capabilities of PS. TS, EP, and ET. At step 913, distributed controller 2 stores the content of the discovery message and forwards the discovery message from distributed controller 1 to all of distributed controller 2's adjacent distributed controllers except distributed controller 1 if the discovery message received is different from previous discovery messages. Each of distributed controller 2's adjacent distributed controllers then store and forward the discovery message to their neighbors, etc. without forwarding the discovery message backward in the direction from which the discovery message was received (e.g. broadcast message) until all distributed controllers have received the discovery message of steps 911 and 913. The discovery message of steps 911/913 is substantially similar to discovery message 311 and contains distributed controller 1's network address, attributes, role as a distributed controller, capabilities, etc. Similar to step 911, at step 915, each of the other distributed controllers such as distributed controller 2 sends a discovery message to its adjacent distributed controllers such as distributed controller 1 after it is configured as a distributed controller with a number of capabilities, roles and attributes. The content of the discovery message of step 915 is substantially similar to the content of the discovery message of step 911. Accordingly, each of the distributed controllers becomes aware of all other distributed controllers' addresses, attributes, roles, and/or capabilities via the discovery message exchange of steps 911, 913, and 915. It should be noted that the distributed controllers may be configured to broadcast discovery messages periodically (e.g. every thirty minutes) and remove information related to any distributed controller that does transmit a discovery message within a specified time (e.g. a timeout after sixty minutes).

At step 921, each distributed controller, such as distributed controller 1, performs topology and/or TE discovery of a corresponding network domain, such as network domain 1, in a manner similar to step 321. At step 925, the distributed controller 1 broadcasts an AP message 925 containing inter-domain links and access point addresses for network domain 1 in a manner similar to step 323. Unlike step 323, the distributed controller 1 broadcasts the AP message of step 925 to all its adjacent distributed controllers instead of to a single parent controller. After receiving the AP message from an adjacent distributed controller, such as controller 1, each distributed controller, such as distributed controller 2, stores the AP message and broadcasts the AP message to all its adjacent distributed controllers at step 927 except for the one from which the AP message is received if the AP message is different from the one received and stored last time. Accordingly, each distributed controller is aware of inter-domain links and access point addresses for all network domains, but remains unaware of internal topology and TE information for any network domain not controlled by the distributed controller.

At step 931, a topology change occurs in network domain 1 that affects network domain 1's inter-domain links and/or access point addresses/identifiers (e.g. similar to step 331). At step 933, distributed controller 1 broadcasts an updated AP message to all its adjacent controllers. After receiving the updated AP message from an adjacent distributed controller such as controller 1, at step 935 a distributed controller, such as distributed controller 2 stores the AP message and broadcasts the AP message to all its adjacent distributed controllers except for the one from which the AP message is received if the updated AP message is different from the one received and stored last time. As such, each distributed controller becomes aware of any changes affecting inter-domain communications of remote network domains (e.g. a domain not controlled by a specified controller). By employing method 900, each distributed controller has sufficient information to compute local path segments and tunnel segments across a local network domain and compute end-to-end inter-domain paths/tunnels across remote network domains. Further, if any controller or domain become unreachable/times out, the other controllers can remove the unreachable controller/domain from consideration for further communication routing.

Figure 10:
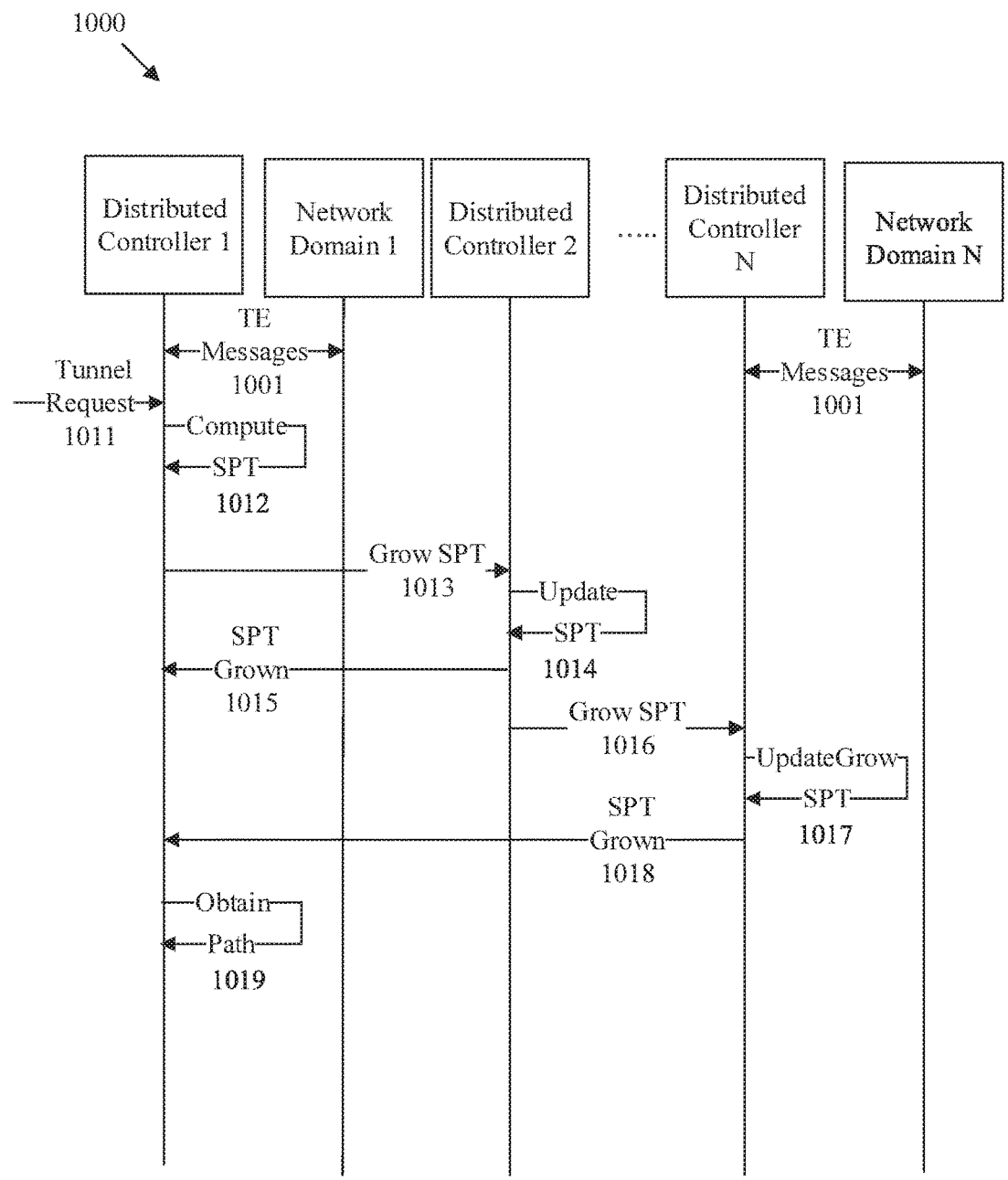
FIG. 10 is a protocol diagram of an embodiment of a method for path computation across network domains controlled by a distributed controller network.

FIG. 10 is a protocol diagram of an embodiment of a method 1000 for path computation across network domains controlled by a distributed controller network, such as network 800. Method 1000 is implemented by distributed controllers 1-N, such distributed controllers 811, each of which may be implemented by a NE such as NE 200 and each of which controls one or more network domains 1-N, such as network domains 813.

Method 1000 may be similar to method 400, but is modified to operate on network 800. Method 1000 is initiated after a controller network is initiated and configured (e.g. according to method 900), such that the distributed controllers are aware of each other's roles, level, capabilities, etc. At step 1001, the distributed controllers exchange TE messages with their respective domains in a manner similar to step 401. At step 1011, a tunnel request is received by distributed controller 1 in a manner similar to step 411. The tunnel request comprises a tunnel source, destination, and/or any requested policy and/or physical constraints. At step 1012, distributed controller 1 computes an SPT across network domain 1 and/or any other network domains controlled by distributed controller 1 if it is the source controller. If it is not source controller, it sends the source controller a grow SPT message, which performs the same actions as distributed controller 1. For example, the distributed controller 1 computes a set of shortest path segments from a local source to each edge node of network domain 1 (or edge node of an adjacent domain), such that all path segments comply with the constraints. The distributed controller 1 adds the edge node/access points to a candidate list, selects the path segment(s) with the minimum routing cost, and adds the edge nodes/access points for the selected minimum routing cost path segments to an SPT.

At step 1013, the distributed controller 1 transmits a grow SPT message to distributed controller 2, which controls the network domain containing/adjacent to the address added to the SPT in step 1012. The grow SPT message comprises the GTID, the GPID, the constraints, the candidate list, the current SPT, an address of a local source (e.g. edge node/access point on the SPT) in/adjacent to a network domain 2 controlled by distributed controller 2, and a destination node in a destination network domain N. At step 1014, the distributed controller 2 computes path segments to each of network domain 2's edge nodes/access points that satisfy the constraints and are not already on the SPT. The distributed controller 2 then updates the SPT by adding all computed path segments to the candidate list and grows the SPT by adding the minimum routing cost path segments to the SPT. At step 1015, the distributed controller 2 transmits an SPT grown message back to distributed controller 1. The SPT grown message comprises the GTID, the GPID, and the local source from network domain 2, which can be used by distributed controller 1 to uniquely identify the SPT being grown. The SPT grown message further comprises a status indicator set to success if the SPT has been grown successfully or fail is the SPT was not grown across the second network domain along with any error codes to indicate a reason for failure (e.g. no path segments satisfy constraints, etc.).

At step 1016, distributed controller 2 transmits a grow SPT message to the next distributed controller to further grow the SPT in a manner similar to step 1013, which continues until distributed controller N is reached that controls the network domain N containing the destination node. At step 1017, the distributed controller N then computes path segment(s) from a local source to the destination node in a manner similar to step 1014 and updates the SPT accordingly. At step 1018, the distributed controller N transmits an SPT grown message to distributed controller 1 in a manner similar to step 1015. The SPT and candidates list are also transmitted back to distributed controller 1, for example as part of the message of step 1018 or as part of a separate message. At step 1019, the distributed controller 1 obtains the path by selecting a shortest end-to-end inter-domain path from the source to the destination in the SPT and/or reviewing the candidate lists for potential alternative shortest paths not included in the SPT. Accordingly, the shortest end-to-end inter-domain path is computed from abstracted links without sharing internal domain topology. It should be noted that in an alternative embodiment, the distributed controller N may select the end-to-end inter-domain path for the tunnel at step 1019 and transmit the selected path to the distributed controller initiating the growth of the SPT. It should also be noted that each distributed controller may save the computed path segments and/or partial SPT trees for each GPID/GTID in a manner similar to methods 400 and/or 600.

Figure 11:
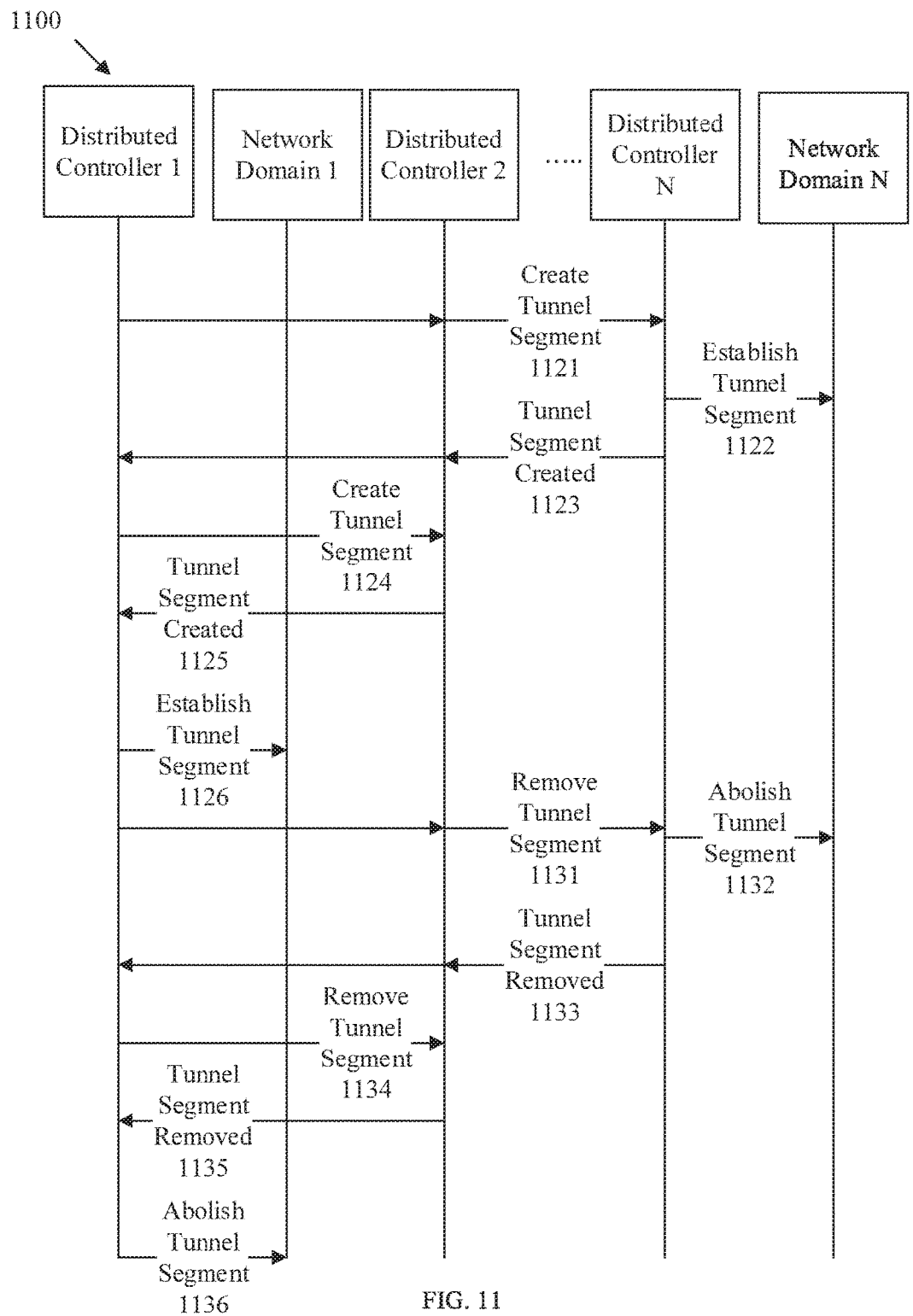
FIG. 11 is a protocol diagram of an embodiment of a method for communication tunnel management across network domains controlled by a distributed controller network.

FIG. 11 is a protocol diagram of an embodiment of a method 1100 for communication tunnel management across network domains controlled by a distributed controller network, such as network 800. Method 1100 is implemented by distributed controllers 1-N, such distributed controllers 811, each of which may be implemented by a NE such as NE 200 and each of which controls one or more network domains 1-N, such as network domains 813.

Method 1100 may be similar to method 500, but is modified to operate on network 800. Method 1100 is initiated after an end-to-end path is computed for a GTID and a GPID, for example according to method 1000. At step 1121, the distributed controller 1 transmits a create tunnel segment message to distributed controller N, via distributed controller 2 and any intervening controllers. The create tunnel segment message comprises the tunnel source address, GPID, GTID, and a list of node pairs to denote the segments to be created in a manner similar to step 521. At step 1122, the distributed controller N establishes the tunnel segment(s) in the destination network domain N and assigns a label in a manner similar to step 522. At step 1123, the distributed controller N transmits a tunnel segment created message comprising the GPID, GTID, an identifier of the tunnel source, a status identifier indicating success if the tunnel segment was successfully set up and fail if the tunnel segment could not be set up. The tunnel segment created message may also comprise an error code if tunnel segment set up was a failure and/or an allocated label. At step 1124, the distributed controller 1 transmits a create tunnel segment message to each intervening controller including distributed controller 2 in a manner similar to step 521, with each create tunnel segment message comprising labels and access point/edge node interfaces of the downstream network domains. Each such distributed controller performs associated establishments in the corresponding network domains and transmits a tunnel segment created message at step 1125 in a manner similar to step 1123. At step 1126, the distributed controller 1 establishes tunnel segment(s) from the source to the adjacent domain completing the inter-domain end-to-end tunnel without exchanging internal network domain topology or TE information between domain controllers. As with steps 522 and 525, establishment in steps 1122 and 1126 include allocation of link(s), port(s), λ, labels, and/or reservation of corresponding bandwidth across associated nodes/links between the start point and the end point. Establishment further includes writing cross-connects between the nodes in the network domains and between different network domains. Steps 1131, 1132, 1133, 1134, 1135, and 1136 abolish the tunnel on a segment by segment basis in substantially the same manner as steps 531-536 except the remove tunnel segment and tunnel segment removed message responses traverse the network of controllers instead of being communicated directly by a parent node. The remove tunnel segment messages comprise the GPID, the GTID, the source address of the tunnel segments to be removed. The receiving controller releases all resources in the network domain associated with the tunnel, releases associated labels, removes the cross-connects, and sends a responsive tunnel segment removed message. The tunnel segment removed message comprises the source. GPID. GTID, a status indicating success for successful tunnel removal or fail to indicate a tunnel segment cannot be removed along with an error code indicating a reason for the failure.

Figure 12:
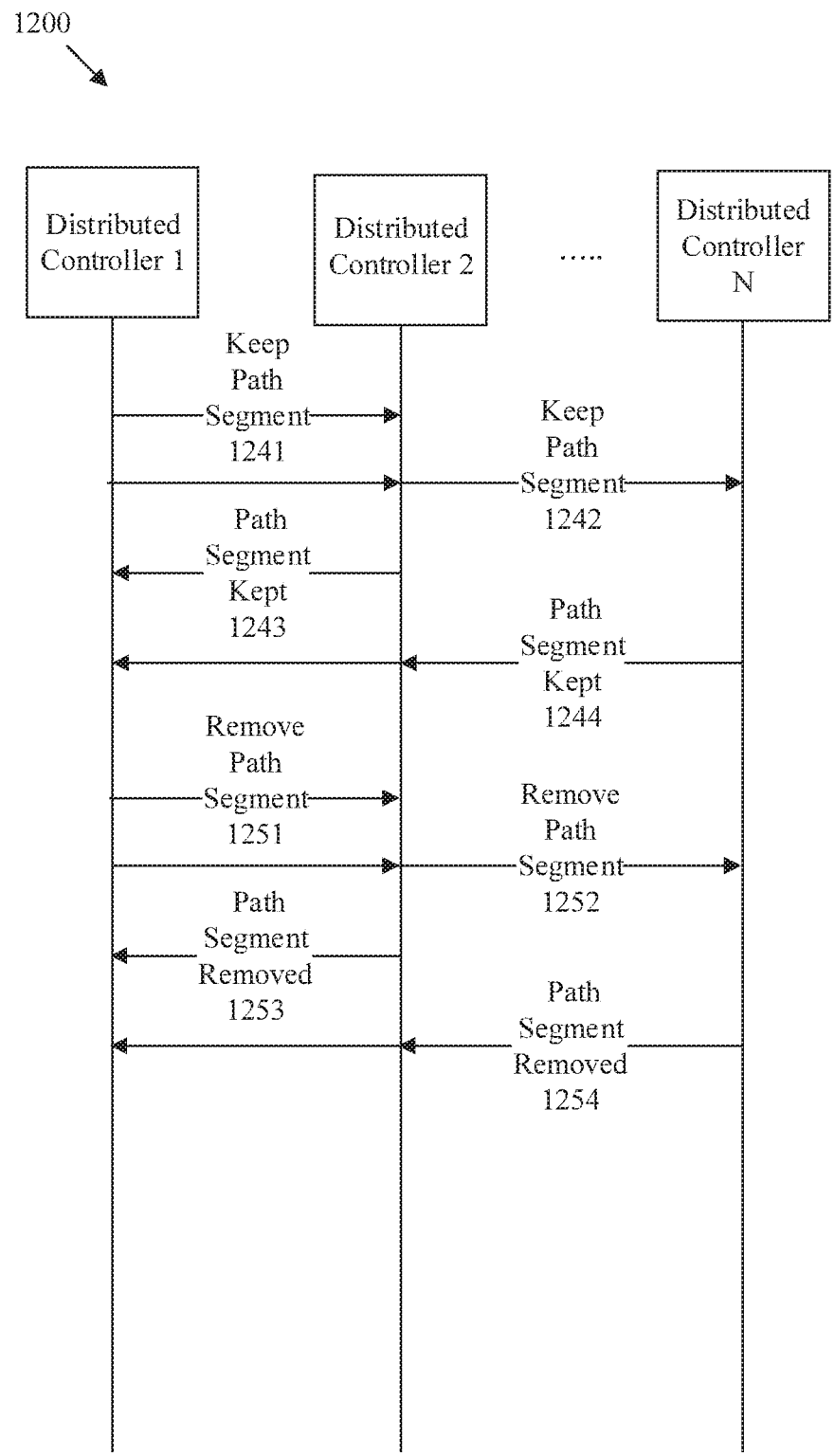
FIG. 12 is a protocol diagram of an embodiment of a method for path segment management across network domains controlled by a distributed controller network.

FIG. 12 is a protocol diagram of an embodiment of a method 1200 for path segment management across network domains controlled by a distributed controller network, such as network 800. Method 1200 is implemented by distributed controllers 1-N, such as distributed controllers 811, each of which may be implemented by a NE such as NE 200 and each of which controls one or more network domains 1-N, such as network domains 813.

Method 1200 may be similar to method 600, but is modified to operate on network 800. Method 1200 is initiated after the SPT has been grown, for example in response to grow SPT messages at step 1013 and/or 1016 of method 1000. At steps 1241 and 1242, distributed controller 1 transmits a keep path segments message to each distributed controller controlling a domain along the SPT. The keep path segments messages comprise the tunnel/path source address, the GTID, and the GPID along with a list of node pairs (e.g. <start point, end point) identifying the SPT segments to be stored indefinitely. The keep path segments messages may comprise a RR flag that can be set to indicate a request to remove all computed path segments associated with the tunnel and not specifically enumerated by the keep path segments message. Each corresponding distributed controller then stores the indicated path segments indefinitely that are related to the tunnel and/or removes all path segments not enumerated. At steps 1243 and 1244, the distributed controllers each send path segment kept messages to the requesting distributed controller. The path segment kept messages comprise an address/identifier of the path/tunnel source, the GTID, the GPID, and data indicating success if the path segments are stored successfully or fail if the path segments cannot be stored and a corresponding error code indicating a reason for the failure.

Distributed controller 1 may later determine to remove path segments stored, for example because the corresponding tunnel is to be removed, because only specified path segments are needed, etc. At steps 1251 and 1252, distributed controller 1 transmits remove path segment messages to distributed controllers 2-N, respectively. The remove path segment messages of steps 1251-1252 may be similar to the remove path segment messages of step 651. Specifically, the remove path segment messages of steps 1251-1252 may indicate computed path segments to be removed in a plurality of ways. For example, a remove path segment message may contain only a tunnel/path source address and GTID, which indicates the corresponding distributed controller should remove all stored segments related to the source and GTID. The remove path segment message may contain a tunnel/path source address, a GTID, and a GPID, which indicates the corresponding distributed controller should remove all stored path segments related to the tunnel/path source address, GTID, and GPID. The remove path segment message may contain the tunnel/path source address, GTID, the GPID, and a list of start point addresses and/or identifiers to indicate that all computed segments associated with the source address, GTID, and GPID and containing the start point address(es)/identifier(s) should be removed. The remove path segment message may contain the tunnel/path source address, the GTID, the GPID, and a list of node pairs, for example in the form <start point, end point>, which indicates that the specifically enumerated path segments as identified by the source address, GTID, and GPID and node pair should be removed. Upon receiving the remove path segment messages of steps 1251-1252, the corresponding distributed controllers remove the indicated computed path segments from memory. At steps 1253 and 1254, the corresponding distributed controllers transmit path segment removed messages to distributed controller 1 to indicate the status of the corresponding path segment removal requests. The path segment removed messages of steps 1253-1254 comprise tunnel/path source address, GTID, and GPID and data indicating the status as success to indicate the requested path segments are successfully removed or fail to indicate the requested path segments are not successfully removed. In the event of a fail, the path segment removed messages of steps 1253-1254 may also comprise an error code and/or a reason for the failure.

Figure 13:
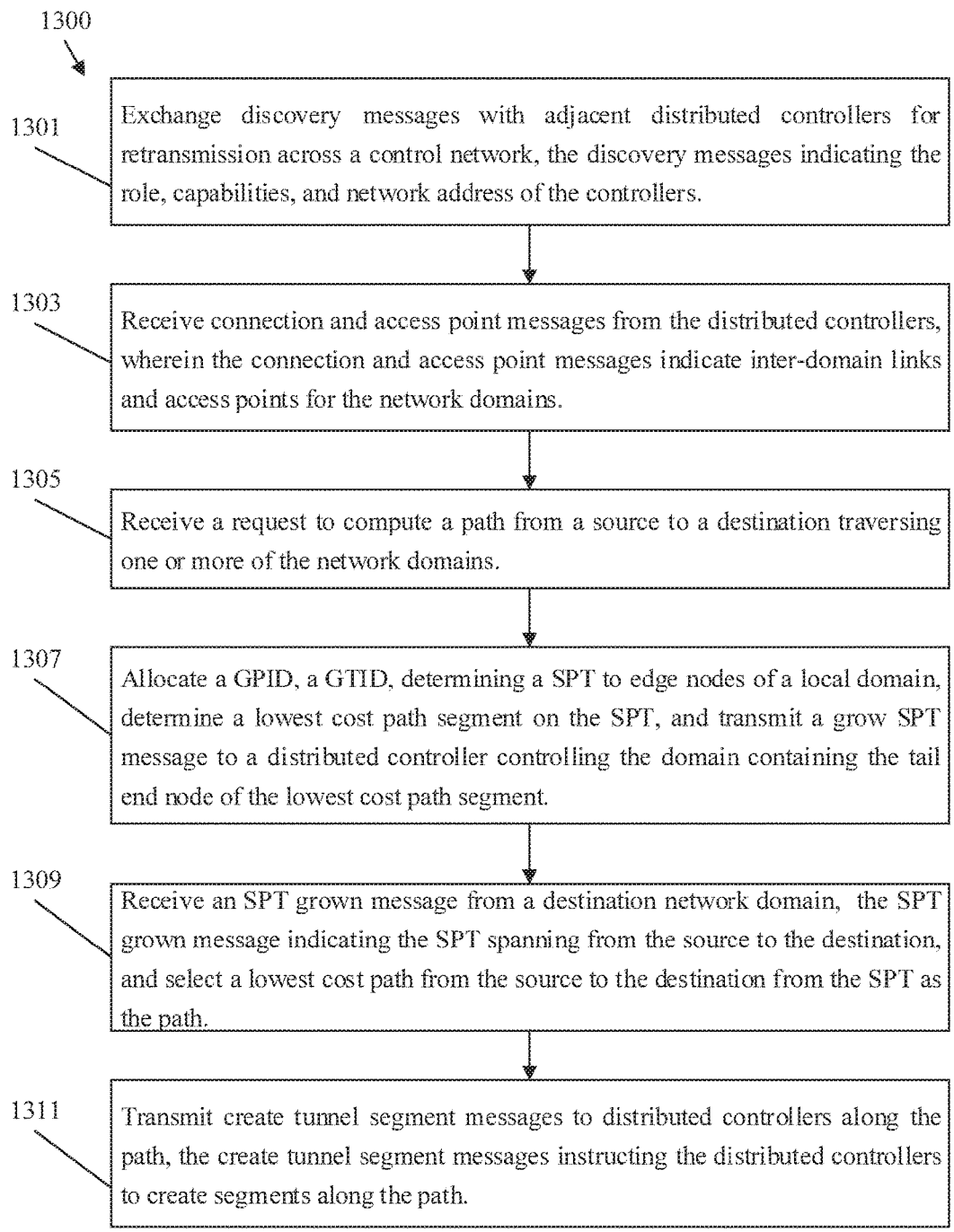
FIG. 13 is a flowchart of an embodiment of a method of operating a distributed controller.

FIG. 13 is a flowchart of an embodiment of a method of operating a distributed controller, such as distributed controller 811 in network 800. Method 1300 begins when the distributed controller determines to discover adjacent distributed controllers in the network. At step 1301, exchanges discovery messages with adjacent distributed controllers for retransmission across a control network, the discovery messages indicating the role, capabilities, and network address of the controllers. For example, a first distributed controller broadcasts a discovery message and receives discovery messages from all distributed controllers in the network. At step 1303, connection and access point messages are received from the other distributed controllers in the network. The connection and access point messages indicate inter-domain links and access points for the network domains. Based on the connection and access point messages, the distributed controller is aware of the abstracted inter-domain topology of the network, but not the internal topology of the individual domains.

At step 1305, a request is received to compute a path from a source to a destination traversing the network domains. The request may be received from the source, the destination, a distributed controller controlling a source/destination domain and/or from the application layer (e.g. a user/network administrator). At step 1307 a GPID and a GTID are allocated to the path/tunnel, respectively. An SPT is calculated to the edge nodes of a local domain controlled by the distributed controller (or to the edge nodes of adjacent domains). A lowest cost path segment on the SPT is then selected, and a grow SPT message is transmitted to a distributed controller controlling the domain containing the tail end node of the lowest cost path segment. At step 1309, an SPT grown message is received from a destination network domain. The SPT grown message indicate the SPT spanning from the source to the destination. A lowest cost path from the source to the destination may then be selected from the SPT as the path. At step 1311, create tunnel segment messages are transmitted to the distributed controllers along the path. The create tunnel segment messages instruct the distributed controllers to create tunnel segments along the path. The distributed controller may also receive tunnel segment created messages indicating the tunnel segments have been properly setup. It should be noted that in some embodiments, the distributed controller in the destination domain is responsible for selecting the path at step 1309 and transmitting the create tunnel segment messages at step 1311. It should also be noted that the distributed controller may also transmit remove path segment messages or keep path segment messages to cause the computed path segments to be removed or stored, respectively. The distributed controller may also receive updated connection and access point messages indicating changes in inter-domain links between domains and access points in domains. The method 1300 may return to step 1305 if the path/tunnel is interrupted or may consider the updated information when computing new paths/tunnels.

Figure 14:
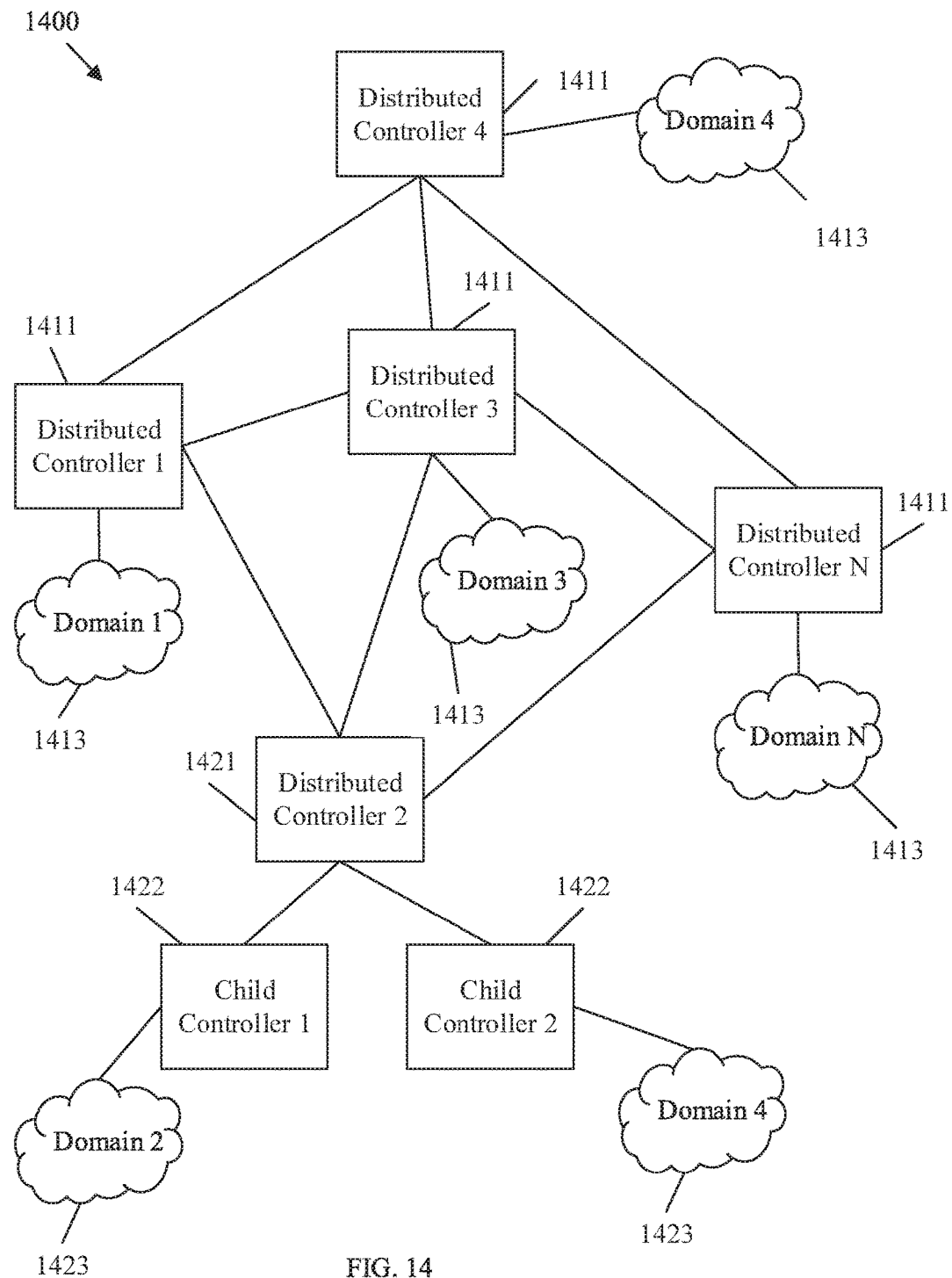
FIG. 14 is a schematic diagram of an embodiment of a hybrid distributed hierarchical controller network.

FIG. 14 is a schematic diagram of an embodiment of a hybrid distributed hierarchical controller network 1400, which may comprise all or portions of both networks 100 and 800. Network 1400 comprises distributed controllers 1411 and network domains 1413, which may be substantially similar to distributed controllers 811 and network domains 813, respectively. Network 1400 further comprises child controllers 1422 and network domains 1423, which may be substantially similar to child controllers 111/121 and network domains 113, respectively. Network 1400 further comprises distributed controller 1421, which may comprise the functionality of a parent controller 101 when interacting with child controllers 1422 and the functionality of a distributed controllers 1411 when interacting with other distributed controllers 1411. Accordingly, network 1400 is a hybrid of networks 100 and 800. In example network 1400, the distributed controller 1421 may employ methods 300-700 when interacting with child controllers 1422 and methods 900-1300 when interacting with distributed controllers 1411. Accordingly, a controller in network 1400 may comprise a role of distributed, parent, and child with all associated capabilities. The hybrid distributed hierarchical controller network 1400 supports a robust customizable control network that can operate to set up and maintain end-to-end inter-domain paths and tunnels for communications over multiple domains without exchanging internal domain topology and TE information. As with networks 100 and 800, distributed controllers 1411 and 1421 and child controllers 1422, as well as hardware in network domains 1413 and 1423 may all be implemented by NEs such as NE 200.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) configured to act as a parent controller, the NE comprising:
    a receiver configured to:
        receive connection and access point messages from a plurality of child controllers, each child controller controlling one or more network domains, wherein the connection and access point messages indicate inter-domain links and access points for the network domains;
        receive a request to compute a path from a source to a destination traversing one or more of the network domains; and
        receive discovery messages from the child controllers, the received discovery messages indicating:
            levels of the corresponding child controllers in a controller hierarchy;
            roles of the corresponding child controllers indicating capabilities of the corresponding child controllers; and
            network addresses of the corresponding child controllers;
    a processor coupled to the receiver and configured to determine a path tree for a path from the source to the destination via the network domains; and
    a transmitter coupled to the processor and configured to transmit a create tunnel segment message to the child controllers controlling at least one network domain along the path, the create tunnel segment message instructing the associated child controllers to create one or more tunnel segments to forward communications from the source to the destination along the path.

2. The NE of claim 1, wherein the transmitter is further configured to transmit discovery messages to the child controllers, the discovery messages indicating a level of the parent controller in the controller hierarchy.

3. The NE of claim 1, wherein the receiver is further configured to receive an updated connection and access point message from a first of the child controllers, wherein the updated connection and access point message indicates a change in an access point of a first domain corresponding to the first child controller without indicating internal topology of the first domain.

4. The NE of claim 1, wherein computing the path between the source and the destination comprises:
    allocating a path identifier identifying the path;
    allocating a global tunnel identifier (GTID) identifying a tunnel to forward the communications along the path between the source and the destination;
    determining domains capable of maintaining a portion of the tunnel; and
    transmitting, via the transmitter, compute segment messages to child controllers controlling the determined domains,
    wherein the compute segment messages comprise the path identifier, the GTID, and request corresponding child controllers to compute candidate path segments for the path tree across corresponding domains.

5. The NE of claim 4, wherein computing the path between the source and the destination further comprises:
    receiving, via the receiver, path segment computed messages from the child controllers, wherein the path segment computed messages comprise the path identifier, the GTID, and the candidate path segments; and
    selecting one or more of the candidate path segments to create the path between the source and the destination traversing the domains without receiving the internal topology of the network domains.

6. The NE of claim 4, wherein the transmitter is further configured to transmit a keep path segment message to a first of the child controllers, wherein the keep path segment message directs the first child controller to maintain a specified candidate path segment in storage.

7. The NE of claim 4, wherein the transmitter is further configured to transmit a remove path segment message to a first of the child controllers, wherein the remove path segment message directs the first child controller to delete a specified candidate path segment from storage.

8. A method implemented in a network element (NE) the method comprising:
    receiving, via a receiver of the NE, connection and access point messages from a plurality of distributed controllers, each distributed controller controlling one or more network domains, wherein the connection and access point messages indicate inter-domain links and access points for the network domains;
    receiving, via the receiver, a request to compute a path from a source to a destination traversing one or more of the network domains;
    computing, via a processor of the NE, the path from the source to the destination via the network domains; and
    transmitting, via a transmitter of the NE, create tunnel segment messages to distributed controllers controlling at least one network domain along the path, the create tunnel segment messages instructing the associated distributed controllers to create one or more tunnel segments to forward communications from the source to the destination along the path, wherein the NE controls a local domain, and wherein computing the path between the source and the destination comprises:
        allocating a path identifier identifying the path;
        allocating a global tunnel identifier (GTID) identifying a tunnel to forward the communications along the path between the source and the destination;

determining a shortest path tree (SPT) to one or more edge nodes of the local domain or one or more edge nodes of an adjacent domain using an inter-domain link;

determining a lowest cost path segment on the SPT terminating at a lowest cost edge node; and transmitting a grow SPT message to a distributed controller controlling a domain with the lowest cost edge node, wherein the grow SPT message contains the path identifier, the GTID, data indicating the characteristics of the SPT without indicating internal topology of the local domain, and directing the distributed controller to grow the SPT across the domain toward the destination.

9. The method of claim 8, wherein the NE is configured to act as a distributed controller and a parent controller.

10. The method of claim 8, further comprising transmitting, via the transmitter, discovery messages to adjacent distributed controllers for retransmission across a control network, the discovery messages indicating a role of the NE indicating capabilities of the NE and a network address of the NE.

11. The method of claim 8, further comprising receiving an updated connection and access point message from a first of the distributed controllers, wherein the updated connection and access point message indicates a change in an access point of a first domain corresponding to the first distributed controller without indicating internal topology of the first domain.

12. The method of claim 8, wherein computing the path between the source and the destination comprises:

receiving an SPT grown message from a destination network domain, wherein the SPT grown message indicates the SPT spanning from the source to the destination without indicating internal topology of network domains along the SPT; and selecting a lowest cost path from the source to the destination from the SPT as the path.

13. The method of claim 8, further comprising transmitting a keep path segment message to a first of the distributed controllers, wherein the keep path segment message directs the first distributed controller to maintain a specified path segment along the path in storage.

14. The method of claim 8, further comprising transmitting a remove path segment message to a first of the distributed controllers, wherein the remove path segment message directs the first distributed controller to delete a specified path segment from storage.

15. A network element (NE) configured to act as a distributed controller and a parent controller, the NE comprising:

a receiver configured to:

receive connection and access point messages from a plurality of child controllers, each child controller controlling one or more child network domains, wherein the connection and access point messages indicate inter-domain links and access points for the child network domains;

receive connection and access point messages from a plurality of distributed controllers, each distributed controller controlling one or more distributed network domains, wherein the connection and access point messages indicate inter-domain links and access points for the distributed network domains; and receive a request to compute a path from a source to a destination;

a processor coupled to the receiver and configured to compute the path from the source to the destination via at least one of the child network domains and at least one of the distributed network domains, wherein computing the path between the source and the destination comprises:

allocating a path identifier identifying the path;

allocating a global tunnel identifier (GTID) identifying a tunnel to forward the communications along the path between the source and the destination; and determining child network domains capable of maintaining a portion of the tunnel; and a transmitter configured to:

transmit compute segment messages to child controllers controlling the determined child network domains, wherein the compute segment messages comprise the path identifier, the GTID, and request corresponding child controllers to compute candidate path segments across corresponding child network domains;

transmit create tunnel segment messages to the child controllers controlling at least one child network domains along the path, the create tunnel messages instructing the associated child controllers to create one or more tunnel segments to forward communications from the source to the destination along the path; and transmit create tunnel segment messages to distributed controllers controlling at least one distributed network domain along the path, the create tunnel segment messages instructing the associated distributed controllers to create one or more tunnel segments to forward communications from the source to the destination along the path.

16. The NE of claim 15, wherein computing the path between the source and the destination further comprises:

receiving, via the receiver, path segment computed messages from the child controllers, wherein the path segment computed messages comprise the path identifier, the GTID, and the candidate path segments;

selecting one or more of the candidate path segments to create a portion of the path traversing at least one of the child network domains and terminating at an edge of an adjacent distributed network domain; and transmitting, via the transmitter, a grow shortest path tree (SPT) message to an adjacent distributed controller controlling the adjacent distributed network domain to extend the portion of the path traversing the child network domains across the distributed network domains.

17. The NE of claim 15, wherein the receiver is further configured to receive a discovery message from a first adjacent distributed controller, and wherein the transmitter is further configured to forward the discovery message to a second adjacent distributed controller but not the child controllers.

18. A method implemented in a parent controller, the method comprising:

exchanging discovery messages between a parent controller and child controllers for discovering parent-child relations, the discovery messages indicating whether a corresponding controller is a parent controller, indicating a level of the corresponding controller in a network hierarchy, and indicating a network address of the corresponding controller;

controlling a network with multiple domains through the child controllers arranged in the network hierarchy;

receiving a request to create an end-to-end tunnel from a source to a destination;

allocating a global tunnel identifier (GTID) for the end-to-end tunnel;

allocating a path identifier for an end-to-end path for the end-to-end tunnel; and transmitting requests to the child controllers for computing path segments in domains controlled by the child controllers, the requests including the GTID and path identifier;

receiving replies from the child controllers containing computed path segments; and computing a shortest path tree (SPT) for the end-to-end path using the computed path segments.

19. The method of claim 18, further comprising transmitting requests to create tunnel segments to each child controller along the computed path to create the end-to-end tunnel along the computed path crossing multiple domains.

\* \* \* \* \*